US011481961B2

(12) United States Patent
Takahashi et al.

(10) Patent No.: US 11,481,961 B2
(45) Date of Patent: Oct. 25, 2022

(54) INFORMATION PROCESSING APPARATUS AND INFORMATION PROCESSING METHOD

(71) Applicant: SONY CORPORATION, Tokyo (JP)

(72) Inventors: Ryohei Takahashi, Kanagawa (JP); Mitsuhiro Hirabayashi, Tokyo (JP); Ohji Nakagami, Tokyo (JP); Satoru Kuma, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 17/280,609

(22) PCT Filed: Sep. 18, 2019

(86) PCT No.: PCT/JP2019/036466
§ 371 (c)(1),
(2) Date: Mar. 26, 2021

(87) PCT Pub. No.: WO2020/071112
PCT Pub. Date: Apr. 9, 2020

(65) Prior Publication Data
US 2021/0343069 A1 Nov. 4, 2021

(30) Foreign Application Priority Data

Oct. 2, 2018 (JP) .............................. JP2018-187817
Jun. 25, 2019 (JP) .............................. JP2019-117700

(51) Int. Cl.
*G06T 15/20* (2011.01)
*G06T 15/04* (2011.01)
(52) U.S. Cl.
CPC .............. *G06T 15/20* (2013.01); *G06T 15/04* (2013.01)

(58) Field of Classification Search
CPC ......... G06T 15/20; G06T 15/04; G06T 11/60; G06T 2207/10016; G06T 7/70;
(Continued)

(56) References Cited

U.S. PATENT DOCUMENTS 4,694,404 A * 9/1987 Meagher .................... G06T 9/40
345/423
5,918,067 A * 6/1999 Kamei ..................... G06F 9/451
710/5

(Continued)

FOREIGN PATENT DOCUMENTS

CN 107464283 A * 12/2017 ............. G06T 17/05

OTHER PUBLICATIONS

Emre B. Aksu, Technologies Under Consideration for Carriage of Point Cloud Data, International Organisation for Standardisation, ISO/IEC JTC1/SC29/WG11, Coding of Moving Pictures and Audio, MPEG2018/N18414, Mar. 2019, pp. 1-40, Geneva, CH.

(Continued)

*Primary Examiner* — Abderrahim Merouan
(74) *Attorney, Agent, or Firm* — Paratus Law Group, PLLC

(57) ABSTRACT

There is provided an information processing apparatus and an information processing method that can enhance the image quality while, at the same time, reducing increase in client's throughput. Image data of a plurality of projection directions is generated by projecting 3D data in a plurality of projection directions and converting the 3D data into two-dimensional data, and projection direction information indicating the projection direction of each piece of the image data is generated as projection metadata. Further, the projection direction information includes additional projection direction identification information that indicates that the image data has been generated by projection in additional (Continued)

projection directions. The present technology is applicable, for example, to a data generation apparatus that generates data for delivering a point cloud.

4 Claims, 31 Drawing Sheets

(58) Field of Classification Search
CPC ........... G06T 7/73; G06T 17/00; G06T 19/20; G06T 2207/10028; G06T 7/11; G06T 2219/2016; G06T 2207/20021; G06T 15/00; G06T 15/10; G06T 19/00; G06T 9/00; G06T 19/003
See application file for complete search history.

(56) References Cited

U.S. PATENT DOCUMENTS

| | | | | |
|---|---|---|---|---|
| 9,754,405 | B1* | 9/2017 | Young | G06T 17/005 |
| 10,992,918 | B2* | 4/2021 | Yip | G06T 3/0031 |
| 2006/0291506 | A1* | 12/2006 | Cain | H04N 21/47202 370/486 |
| 2007/0033612 | A1* | 2/2007 | Lerman | H04N 21/4348 725/39 |
| 2009/0240716 | A1* | 9/2009 | Lin | H04N 21/4147 |
| 2013/0258281 | A1* | 10/2013 | Pirie | A61B 3/0008 351/206 |
| 2014/0002598 | A1* | 1/2014 | Kim | H04N 21/816 348/43 |
| 2014/0056499 | A1* | 2/2014 | Park | G06T 5/003 382/131 |
| 2014/0185742 | A1* | 7/2014 | Chen | G06T 7/187 378/5 |
| 2014/0185923 | A1* | 7/2014 | Chen | G06K 9/00523 382/154 |
| 2017/0289533 | A1* | 10/2017 | Ono | G06F 3/04883 |
| 2018/0077210 | A1* | 3/2018 | Hannuksela | H04L 65/4084 |
| 2018/0198979 | A1* | 7/2018 | Katsumata | G06T 5/00 |
| 2018/0240276 | A1* | 8/2018 | He | G06T 3/0087 |
| 2018/0260990 | A1* | 9/2018 | Brunner | G06T 5/40 |
| 2018/0332265 | A1* | 11/2018 | Hwang | H04N 13/183 |
| 2018/0343472 | A1* | 11/2018 | Wang | H04N 21/816 |
| 2019/0014305 | A1* | 1/2019 | Wang | H04N 21/44 |
| 2019/0030712 | A1* | 1/2019 | Sciog | B25J 9/1661 |
| 2019/0052858 | A1* | 2/2019 | Yip | H04N 13/00 |
| 2019/0236810 | A1* | 8/2019 | Vosoughi | G06T 9/40 |
| 2019/0251744 | A1* | 8/2019 | Flagg | G06K 9/00523 |
| 2020/0219286 | A1* | 7/2020 | Sinharoy | G06T 9/001 |
| 2021/0243420 | A1* | 8/2021 | Yip | H04N 13/139 |
| 2021/0343069 | A1* | 11/2021 | Takahashi | G06T 15/20 |

OTHER PUBLICATIONS

Khaled Mammou et al., Study Text of ISO/IEC CD 23090 5: Video-based Point Cloud Compression, International Organisation for Standardisation, ISO/IEC JTC1/SC29/WG11 N18180, Coding of Moving Pictures and Audio, Jan. 2019, pp. i-94, Marrakesh, Morocco.

VRStream: Status OMAF and VR-IF, 3GPP TSG SA4 Meeting #96, S4-171168, Nov. 13-17, 2017, pp. 1-5, Albuquerque, New Mexico, US.

Khaled Mammou et al., Working draft of Point Cloud Coding for Category 2 (Draft 1), International Organization for Standardization, ISO/IEC JTC1/SC29/WG11, Coding of Moving Pictures and Audio, MPEG 2018/N17534, Apr. 2018, pp. 1-33, San Diego, US.

Danillo Graziosi et al., PCC Core Experiment on Patch Packing, International Organisation for Standardisation, ISO/IEC JTC1/SC29/WG11, Coding of Moving Pictures and Audio, Jul. 2018, pp. 1-10, Ljubljana, Slovenia.

Wang et al., Signaling of 2D and 3D Spatial Relationship of V-PCC Tiles for their Partial Access and Delivery, International Organisation for Standardisation ISO/IEC JTC1/SC29/WG11 Coding of Moving Pictures and Audio, Jul. 2019, pp. 1-12, Gothenburg, SE.

Xu et al., Introduction to Point Cloud Compression, ZTE Communications, Aug. 24, 2018, pp. 3-8, vol. 16, No. 3.

\* cited by examiner

FIG.4
6 PROJECTION PLANES
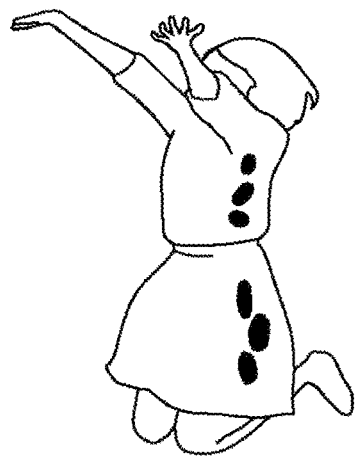
HOLES IN SURFACE
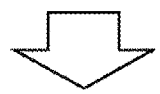
10 PROJECTION PLANES
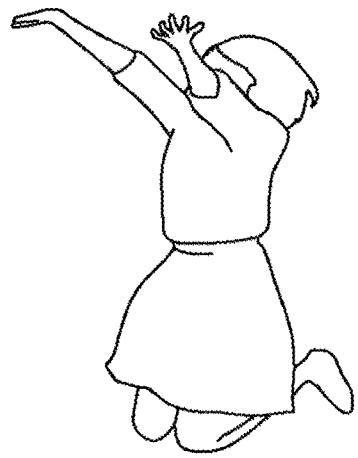
HOLES ARE FILLED FIG.7
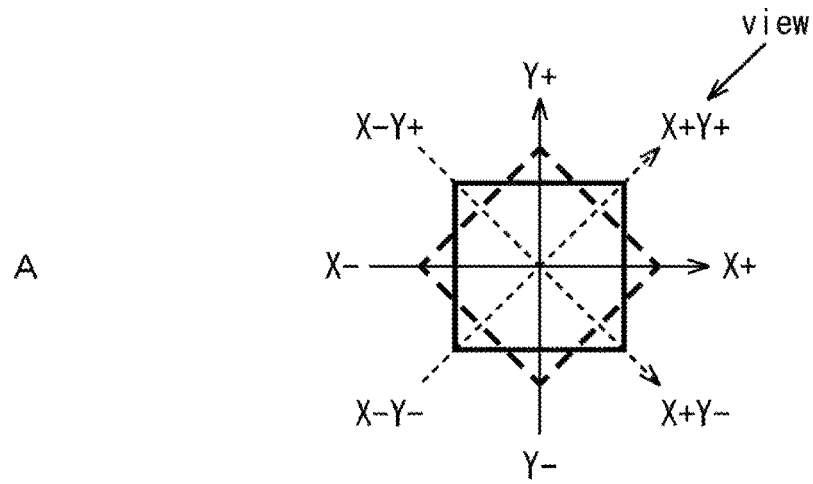
A
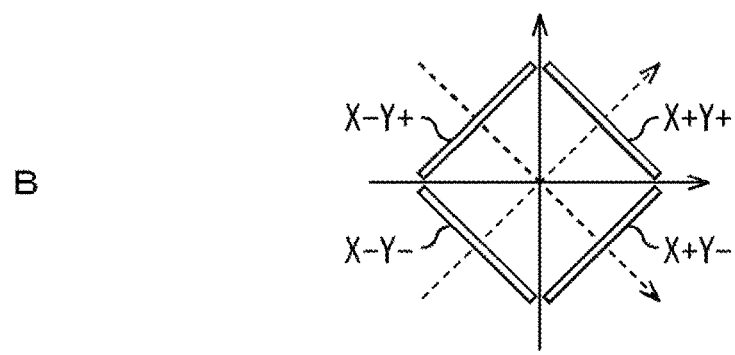
IN CASE WHERE X+Y+ CAN BE DISPLAYED ALONE
B
6 FILES OF X+Y+, X-Y+, X-Y-, X+Y-, Z+, Z- ACQUIRED
IN CASE WHERE X+Y+ CANNOT BE DISPLAYED ALONE
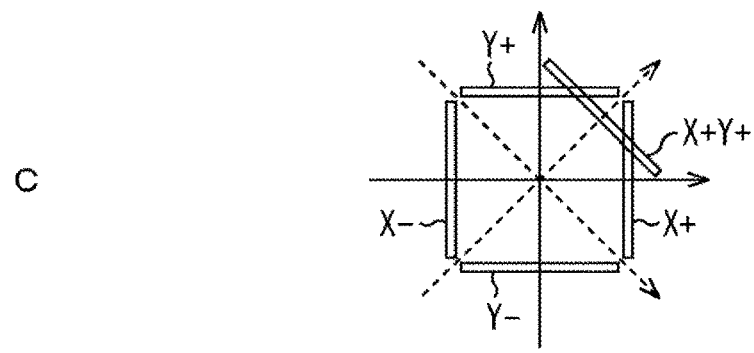
C
7 FILES OF X+Y+, Y+, X-, Y-, X+, Z+, Z- ACQUIRED

FIG. 8

```
<MPD>
  <Period>
    <AdaptationSet id="vpcc0" mimeType="video/mp4">
      <SupplementalProperty schemeIdUri="urn:mpeg:mpegI:pc_proj_direction:2018" value="0" />
      <SupplementalProperty schemeIdUri="urn:mpeg:mpegI:pc_present_alone:2018" value="1" />
      <SupplementalProperty schemeIdUri="urn:mpeg:mpegI:pc_group:2018" value="0" />
      <Representation>
        <BaseURL>vpcc0_1.mp4</BaseURL>
      </Representation>
      ...
    </AdaptationSet>
    <AdaptationSet id="vpcc45" mimeType="video/mp4">
      <SupplementalProperty schemeIdUri="urn:mpeg:mpegI:pc_proj_direction:2018" value="6" />
      <SupplementalProperty schemeIdUri="urn:mpeg:mpegI:pc_present_alone:2018" value="0" />
      <SupplementalProperty schemeIdUri="urn:mpeg:mpegI:pc_group:2018" value="0" />
      <Representation>
        <BaseURL>vpcc45_1.mp4</BaseURL>
      </Representation>
      ...
    </AdaptationSet>
    <AdaptationSet id="vpcc90" mimeType="video/mp4">
      <SupplementalProperty schemeIdUri="urn:mpeg:mpegI:pc_proj_direction:2018" value="1" />
      <SupplementalProperty schemeIdUri="urn:mpeg:mpegI:pc_present_alone:2018" value="1" />
      <SupplementalProperty schemeIdUri="urn:mpeg:mpegI:pc_group:2018" value="0" />
      <Representation>
        <BaseURL>vpcc90_1.mp4</BaseURL>
      </Representation>
      ...
    </AdaptationSet>
    ...
</MPD>
```

FIG.10

```
<MPD>
  <Period>
    <AdaptationSet id="vpcc0" mimeType="video/mp4">
      <SupplementalProperty schemeIdUri="urn:mpeg:mpegI:pc_proj_direction:2018" value="0"/>
      <SupplementalProperty schemeIdUri="urn:mpeg:mpegI:pc_group:2018" value= "0"/>
      <Representation id="vpcc0_1">
        <BaseURL>vpcc0_1.mp4</BaseURL>
      </Representation>
      ...
    </AdaptationSet>
    <AdaptationSet id="vpcc45" mimeType="video/mp4">
      <SupplementalProperty schemeIdUri="urn:mpeg:mpegI:pc_proj_direction:2018" value="6"/>
      <SupplementalProperty schemeIdUri="urn:mpeg:mpegI:pc_group:2018" value= "0"/>
      <Representation id="vpcc45_1" dependencyId="vpcc0_1 vpcc90_1">
        <BaseURL>vpcc45_1.mp4</BaseURL>
      </Representation>
      ...
    </AdaptationSet>
    <AdaptationSet id="vpcc90" mimeType="video/mp4">
      <SupplementalProperty schemeIdUri="urn:mpeg:mpegI:pc_proj_direction:2018" value="1"/>
      <SupplementalProperty schemeIdUri="urn:mpeg:mpegI:pc_group:2018" value= "0"/>
      <Representation id="vpcc90_1">
        <BaseURL>vpcc90_1.mp4</BaseURL>
      </Representation>
      ...
    </AdaptationSet>
    ...
</MPD>
```

FIG.11

```
<MPD>
<Period>
<AdaptationSet id="vpcc0" mimeType="video/mp4" >
<SupplementalProperty schemeIdUri="urn:mpeg:mpegI:pc_45degree_projection:2018" value="0" />
<SupplementalProperty schemeIdUri="urn:mpeg:mpegI:pc_proj_direction:2018" value="0" />
<SupplementalProperty schemeIdUri="urn:mpeg: mpegI: pc_present_alone:2018" value="1" />
<SupplementalProperty schemeIdUri="urn:mpeg:mpegI:pc_group:2018" value="0" />
<Representation>
<BaseURL>vpcc0_1.mp4</BaseURL>
</Representation>
...
</AdaptationSet>
<AdaptationSet id="vpcc45" mimeType="video/mp4" >
<SupplementalProperty schemeIdUri="urn:mpeg:mpegI:pc_45degree_projection:2018" value="1" />
<SupplementalProperty schemeIdUri="urn:mpeg:mpegI:pc_proj_direction:2018" value="0" />
<SupplementalProperty schemeIdUri="urn:mpeg: mpegI: pc_present_alone:2018" value="0" />
<SupplementalProperty schemeIdUri="urn:mpeg:mpegI:pc_group:2018" value="0" />
<Representation>
<BaseURL>vpcc45_1.mp4</BaseURL>
</Representation>
...
</AdaptationSet>
<AdaptationSet id="vpcc90" mimeType="video/mp4" >
<SupplementalProperty schemeIdUri="urn:mpeg:mpegI:pc_45degree_projection:2018" value="0" />
<SupplementalProperty schemeIdUri="urn:mpeg:mpegI:pc_proj_direction:2018" value="1" />
<SupplementalProperty schemeIdUri="urn:mpeg: mpegI: pc_present_alone:2018" value="1" />
<SupplementalProperty schemeIdUri="urn:mpeg:mpegI:pc_group:2018" value="0" />
<Representation>
<BaseURL>vpcc90_1.mp4</BaseURL>
</Representation>
...
</AdaptationSet>
</MPD>
```

FIG. 13

```xml
<MPD>
<Period>
<AdaptationSet id="vpcc0" mimeType="video/mp4" >
  <SupplementalProperty schemeIdUri="urn:mpeg:mpegI:gpcc:block_information:2018">
    <vpcc:blockInfo block_offset_x="0" block_offset_y="0" block_offset_z="0" block_size_x="0.5" block_size_y="0.5" block_size_z="1" object_id="1" />
  </SupplementalProperty>
  <SupplementalProperty schemeIdUri="urn:mpeg:mpegI:pc_45degree_projection:2018" value="0" />
  <SupplementalProperty schemeIdUri="urn:mpeg:mpegI:pc_proj_direction:2018" value="0" />
  <SupplementalProperty schemeIdUri="urn:mpeg:mpegI:pc_present_alone:2018" value="1" />
  <SupplementalProperty schemeIdUri="urn:mpeg:mpegI:pc_group:2018" value="0" />
  <Representation>
    <BaseURL>vpcc0_1.mp4</BaseURL>
  </Representation>
</AdaptationSet>
  .
  .
<AdaptationSet id="vpcc45" mimeType="video/mp4" >
  <SupplementalProperty schemeIdUri="urn:mpeg:mpegI:gpcc:block_information:2018">
    <vpcc:blockInfo block_offset_x="0" block_offset_y="0" block_offset_z="0" block_size_x="0.5" block_size_y="0.5" block_size_z="1" object_id="1" />
  </SupplementalProperty>
  <SupplementalProperty schemeIdUri="urn:mpeg:mpegI:pc_45degree_projection:2018" value="1" />
  <SupplementalProperty schemeIdUri="urn:mpeg:mpegI:pc_proj_direction:2016" value="0" />
  <SupplementalProperty schemeIdUri="urn:mpeg:mpegI:pc_present_alone:2018" value="0" />
  <SupplementalProperty schemeIdUri="urn:mpeg:mpegI:pc_group:2018" value="0" />
  <Representation>
    <BaseURL>vpcc45_1.mp4</BaseURL>
  </Representation>
</AdaptationSet>
  .
  .
</MPD>
```

FIG. 19

```
<MPD>
<Period>
<AdaptationSet id="vpcc0" mimeType="video/mp4">
<SupplementalProperty schemeIdUri="urn:mpeg:mpeg:pc_proj_direction:2018" value="0"/>
<SupplementalProperty schemeIdUri="urn:mpeg:mpeg:pc_present_alone:2018" value="1"/>
<SupplementalProperty schemeIdUri="urn:mpeg:mpeg:pc_group:2018" value="0"/>
<Representation>
<SupplementalProperty schemeIdUri="urn:mpeg:mpeg:pc_resolution:2018" value="2000000"/>
<BaseURL>vpcc0_1.mp4</BaseURL>
</Representation>
<Representation>
<SupplementalProperty schemeIdUri="urn:mpeg:mpeg:pc_resolution:2018" value="1000000"/>
<BaseURL>vpcc0_2.mp4</BaseURL>
</Representation>
    :
</AdaptationSet>
    :
</MPD>
```

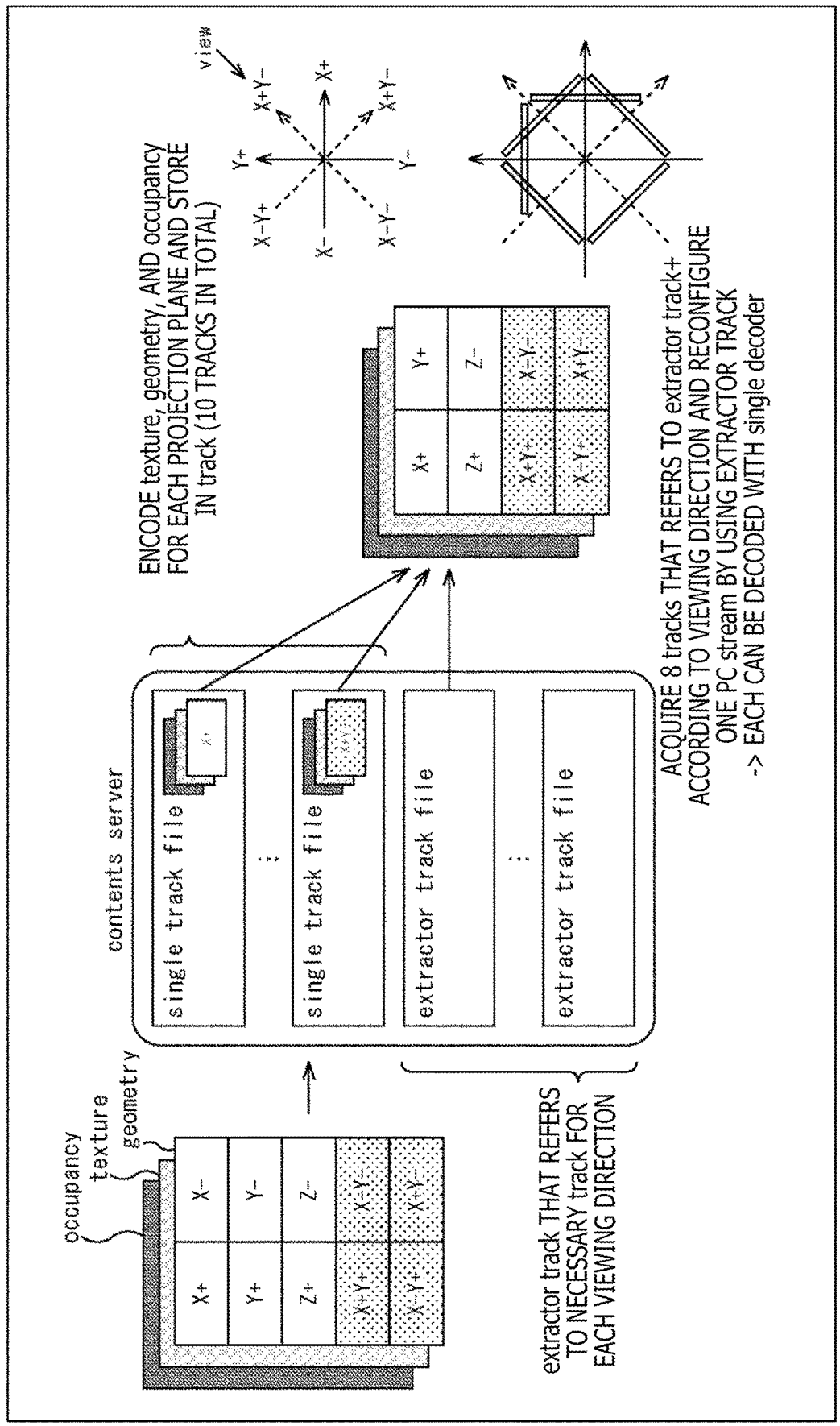

F I G. 2 1

```
<MPD>
<Period>
<AdaptationSet id="vpcc_ext" mimeType="video/mp4">
<SupplementalProperty schemeIdUri="urn:mpeg:mpegI:pc_hq_direction:2018" value="6" />
<Representation dependencyId="vpcc0_1 vpcc90_1">
<BaseURL>vpcc_ext_1.mp4</BaseURL>
</Representation>
...
</AdaptationSet>
...
</MPD>
```

FIG. 22

```
aligned(8) class VPCCGroupBox extends TrackGroupTypeBox('vpgp')
{
    unsigned int(7) projection_direction;
    unsigned int(1) present_alone;
    unsigned int(32) point_cloud_resolution;
}
```

FIG. 23

| FIELD | MEANING |
|---|---|
| projection_direction | INDICATES PROJECTION DIRECTION.<br>0:X+, 1:Y+, 2:X-, 3:Y-, 4:Z+, 5:Z-, 6:X+Y+, 7:X-Y+, 8:X-Y-, 9:X+Y- |
| present_alone | INDICATES WHETHER OR NOT Point Cloud CAN BE CONSTRUCTED AND DISPLAYED WITH TRACK ALONE.<br>0: CANNOT BE DISPLAYED ALONE, 1: CAN BE DISPLAYED ALONE |
| point_cloud_resolution | FRAME AVERAGE OF PATCH TOTAL PIXEL COUNT FOR EACH FRAME IN V-PCC STREAM.<br>INDICATES FRAME AVERAGE COUNT OF Point Cloud CONSTRUCTED. |

FIG. 24

```
aligned(8) class VPCCGroupBox extends TrackGroupTypeBox('vpgp')
{
    unsigned int(7)  projection_direction;
    unsigned int(1)  present_alone;
    unsigned int(1)  45degree_projection;
    unsigned int(7)  reserved=0;
    unsigned int(32) point_cloud_resolution;
}
```

FIG. 25

| FIELD | MEANING |
|---|---|
| 45degree_projection | 0: INDICATES THAT STREAM HAS BEEN GENERATED FROM PATCHES OF SIX PROJECTION DIRECTIONS<br>1: INDICATES THAT STREAM HAS BEEN GENERATED FROM PATCHES OF FOUR ADDITIONAL PROJECTION DIRECTIONS |
| projection_direction | INDICATES PROJECTION DIRECTION.<br>0: X+, 1: Y+, 2: X-, 3: Y-, 4: Z+, 5: Z- |
| present_alone | INDICATES WHETHER OR NOT Point Cloud CAN BE CONSTRUCTED AND DISPLAYED WITH TRACK ALONE.<br>0: CANNOT BE DISPLAYED ALONE, 1: CAN BE DISPLAYED ALONE |
| point_cloud_resolution | FRAME AVERAGE OF PATCH TOTAL PIXEL COUNT FOR EACH FRAME IN V-PCC STREAM.<br>INDICATES FRAME AVERAGE COUNT OF Point Cloud CONSTRUCTED. |

FIG.26

```
aligned(8) class VPCCGroupBox extends TrackGroupTypeBox('vpgp')
{
    unsigned int(7) projection_direction;
    unsigned int(1) present_alone;
    unsigned int(1) 45degree_projection;
    unsigned int(7) reserved=0;
    unsigned int(32) point_cloud_resolution;
    unsigned int(32) block_offset_x;
    unsigned int(32) block_offset_y;
    unsigned int(32) block_offset_z;
    unsigned int(32) block_size_x;
    unsigned int(32) block_size_y;
    unsigned int(32) block_size_z;
}
```

FIG. 27

| frame_auxiliary_information( ) { | Descriptor |
|---|---|
|     patch_count | u(32) |
|     occupancy_precision | u(8) |
|     max_candidate_count | u(8) |
|     bit_count_u0 | u(8) |
|     bit_count_v0 | u(8) |
|     bit_count_u1 | u(8) |
|     bit_count_v1 | u(8) |
|     bit_count_d1 | u(8) |
|     occupancy_aux_stream_size | u(32) |
|     ByteCount += 15 | |
|     for (i=0;i<patch_count;i++) { | |
|         projection_direction | u(7) |
|         present_alone | u(1) |
|         point_cloud_resolution | u(32) |
|         patchList[i].patch_u0 | ae(v) |
|         patchList[i].patch_v0 | ae(v) |
|         patchList[i].patch_u1 | ae(v) |
|         patchList[i].patch_v1 | ae(v) |
|         patchList[i].patch_d1 | ae(v) |
|         patchList[i].delta_size_u0 | se(v) |
|         patchList[i].delta_size_v0 | se(v) |
|         patchList[i].normal_axis | ae(v) |
|     } | |
|     for (i=0;i<blockCount;i++) { | |
|         if(candidatePatches[i].size( ) == 1) | |
|             blockToPatch[i] = candidatePatches[i][0] | |
|         else{ | |
|             candidate_index | ae(v) |
|             if(candidate_index == max_candidate_count) | |
|                 blockToPatch[i] = patch_index | ae(v) |
|             else | |

FIG. 28

| FIELD | MEANING |
|---|---|
| projection_direction | INDICATES PROJECTION DIRECTION.<br>0:X+, 1:Y+, 2:X-, 3:Y-, 4:Z+, 5:Z-, 6:X+Y+, 7:X-Y+, 8:X-Y-, 9:X+Y- |
| present_alone | INDICATES WHETHER OR NOT Point Cloud CAN BE CONSTRUCTED AND DISPLAYED WITH PATCH ALONE.<br>0: CANNOT BE DISPLAYED ALONE, 1: CAN BE DISPLAYED ALONE |
| point_cloud_resolution | PATCH PIXEL COUNT |

FIG.29

| ... | |
|---|---|
| for(i=0; i<patch_count; i++) { | |
| projection_direction | u(7) |
| present_alone | u(1) |
| 45degree_projection | u(1) |
| reserved | u(7) |
| point_cloud_resolution | u(32) |
| patchList[i].patch_u0 | ae(v) |
| patchList[i].patch_v0 | ae(v) |
| patchList[i].patch_u1 | ae(v) |
| patchList[i].patch_v1 | ae(v) |
| patchList[i].patch_d1 | ae(v) |
| patchList[i].delta_size_u0 | se(v) |
| patchList[i].delta_size_v0 | se(v) |
| patchList[i].normal_axis | ae(v) |
| } | |
| ... | |

FIG. 30

| FIELD | MEANING |
|---|---|
| 45degree_projection | 0: INDICATES THAT PATCHES ARE OF SIX PROJECTION DIRECTIONS<br>1: INDICATES THAT PATCHES ARE OF FOUR ADDITIONAL PROJECTION DIRECTIONS |
| projection_direction | INDICATES PROJECTION DIRECTION FOR EACH PATCH.<br>0: X+, 1: Y+, 2: X−, 3: Y−, 4: Z+, 5: Z− |
| present_alone | INDICATES WHETHER OR NOT Point Cloud CAN BE CONSTRUCTED AND DISPLAYED WITH TRACK ALONE.<br>0: CANNOT BE DISPLAYED ALONE, 1: CAN BE DISPLAYED ALONE |
| point_cloud_resolution | PATCH PIXEL COUNT |

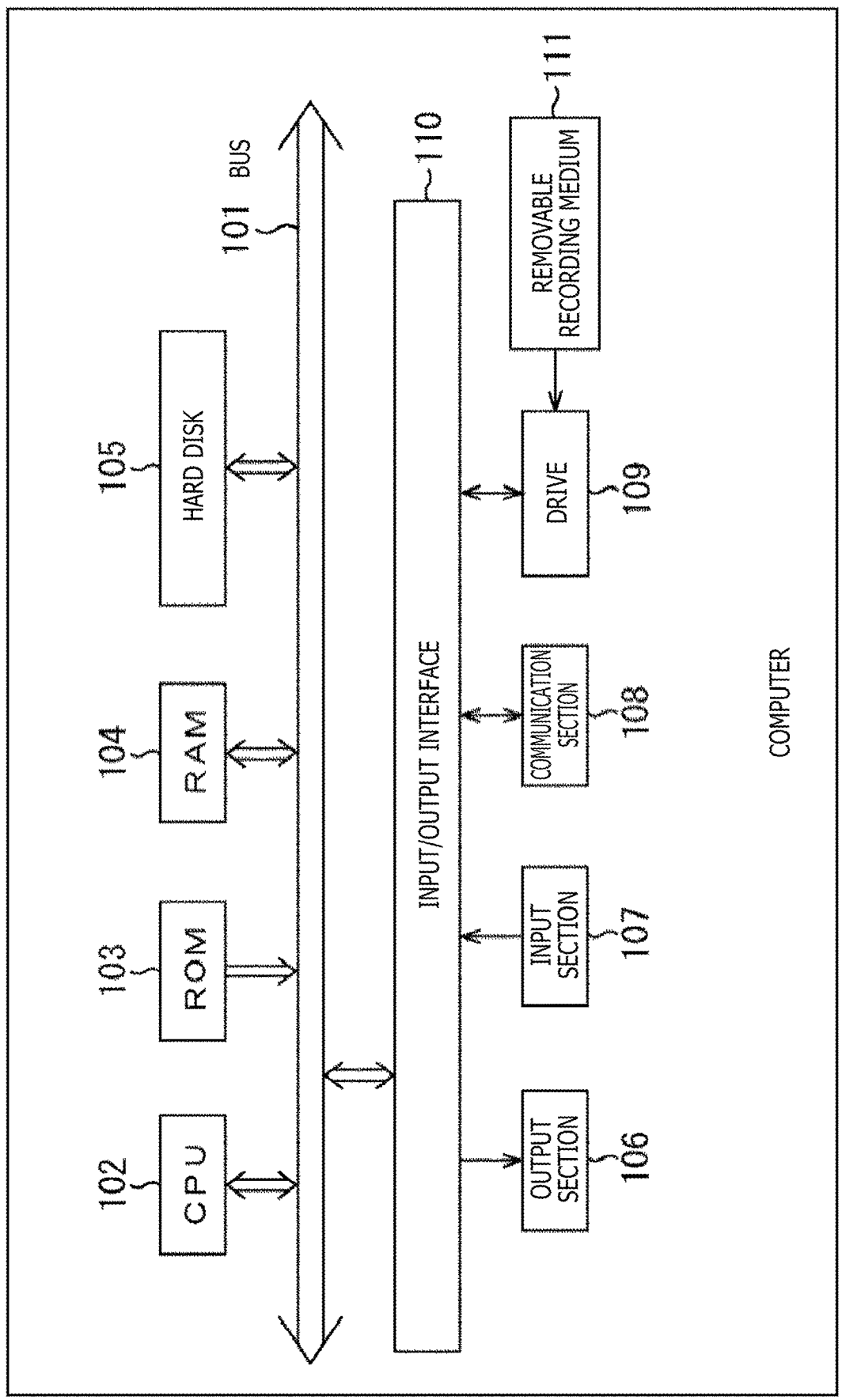

INFORMATION PROCESSING APPARATUS AND INFORMATION PROCESSING METHOD

CROSS REFERENCE TO PRIOR APPLICATION

This application is a National Stage Patent Application of PCT International Patent Application No. PCT/JP2019/036466 (filed on Sep. 18, 2019) under 35 U.S.C. § 371, which claims priority to Japanese Patent Application Nos. 2018-187817 (filed on Oct. 2, 2018) and 2019-117700 (filed on Jun. 25, 2019) which are all hereby incorporated by reference in their entirety.

TECHNICAL FIELD

The present disclosure relates to an information processing apparatus and an information processing method, and more particularly, to an information processing apparatus and an information processing method that can enhance the image quality while, at the same time, reducing increase in client's throughput.

BACKGROUND ART

Conventionally, a compression method of a point cloud, which is a set of points having position information and attribute information (color information, in particular) in a three-dimensional space at the same time, has been stipulated as disclosed in NPL 1.

Also, NPL 2 discloses, as one of point cloud compression methods, a method that divides point cloud data into plural regions (hereinafter referred to as segmentation), generates a texture image, a geometry image, an occupancy map image, and auxiliary information through projection onto a plane for each region, and codes these three kinds of images with a video codec. Here, the geometry image includes depth information of a group of points included in the point cloud. Also, this method is referred to as video-based point cloud coding (V-PCC).

Incidentally, six projection planes (four planes in a horizontal direction and two planes in a vertical direction) have been used to generate a texture image, a geometry image, and an occupancy map image through projection onto a plane for each region after segmentation of point cloud data. As described above, in a case where six projection planes are used, many points have disappeared during conversion from 3D data to 2D data, resulting in holes on a surface of a reconstructed point cloud object in some cases.

In view of the above circumstances, there has been developed a technique that increases the number of projection planes to 10 (eight planes in the horizontal direction and two planes in the vertical direction) by adding four new planes as disclosed in NPL 3, and this technique is under discussion also in MPEG (Moving Pictures Experts Group).

Also, NPL 4 discloses a technique that permits partial access to individual blocks into which an object box is divided.

CITATION LIST

Non Patent Literature

[NPL 1]
MPEG-I Part5 Point Cloud Compression (ISO/IEC 23090-5)
[NPL 2]
w17534, Working draft of Point Cloud Coding for Category 2 (Draft 1), April 2018, San Diego, USA
[NPL 3]
w17871, PCC Core Experiment on Patch packing, July 2018, Ljubljana, Slovenia
[NPL 4]
ISO/IEC JTC 1/SC 29/WG 11 Coding of moving pictures and audio Convenorship: UNI (Italy) "Technologies Under Consideration for Carriage of Point Cloud Data"

SUMMARY

Technical Problems

Incidentally, it is assumed that the addition of new projection planes to enhance the image quality as described above will increase client's throughput. Also, a conventional client has been unable to identify in advance whether a delivered stream has been generated by images produced from normal six projection planes or from four new additional projection planes. For this reason, the client is required to acquire an entire stream, possibly resulting in interruption of reproduction or degraded image quality and increased processing overhead on the client side in an environment of limited network bandwidth.

The present disclosure has been devised in light of such circumstances, and it is an object of the present disclosure to enhance the image quality while, at the same time, reducing increase in client's throughput.

Solution to Problems

An information processing apparatus of an aspect of the present disclosure includes a preprocessing section adapted to generate image data of a plurality of projection directions by projecting 3D data in a plurality of the projection directions and converting the 3D data into two-dimensional data and generate projection direction information indicating the projection directions of the image data as projection metadata.

An information processing method of an aspect of the present disclosure includes generating image data of a plurality of projection directions by projecting 3D data in a plurality of the projection directions and converting the data into two-dimensional data, and generating projection direction information indicating the projection directions of the image data as projection metadata.

In an aspect of the present disclosure, image data of a plurality of projection directions is generated by projecting 3D data in a plurality of projection directions and converting the 3D data into two-dimensional data, and projection direction information indicating the projection direction of each piece of image data is generated as projection metadata.

BRIEF DESCRIPTION OF DRAWINGS

FIG. 4 is a diagram describing improvement of image quality achieved by increasing projection planes.

FIG. 7 depicts diagrams describing examples of acquiring files according to a viewing direction.

FIG. 8 is a diagram illustrating an MPD sample in a first signaling method in a first extension method.

FIG. 10 is a diagram illustrating an MPD sample in a second signaling method in the first extension method.

FIG. 11 is a diagram illustrating an MPD sample signaling additional projection direction identification information.

FIG. 13 is a diagram illustrating an MPD sample signaling additional projection direction identification information set for each block.

FIG. 19 is a diagram illustrating an MPD sample to which image quality metadata has been added.

FIG. 20 is a diagram describing a modification example using an extractor track.

FIG. 21 is a diagram illustrating an MPD sample using an extractor track.

FIG. 22 is a diagram illustrating an example of newly defined VPCCGroupBox.

FIG. 23 is a diagram describing definitions of projection_direction, present_alone, and point_cloud_resolution.

FIG. 24 is a diagram illustrating a sample of VPCCGroupBox signaling additional projection direction identification information.

FIG. 25 is a diagram describing definitions of 45 degree_projection, projection_direction, present_alone, and point_cloud_resolution.

FIG. 26 is a diagram illustrating a sample of VPCCGroupBox signaling additional projection direction identification information set for each block.

FIG. 27 is a diagram describing extension of auxiliary information.

FIG. 28 is a diagram describing definitions of projection_direction, present_alone, and point_cloud_resolution.

FIG. 29 is a diagram illustrating part of auxiliary information to which 45 degree_projection has been added.

FIG. 30 is a diagram describing definitions of 45 degree_projection, projection_direction, present_alone, and point_cloud_resolution.

FIG. 31 is a block diagram illustrating a configuration example of an embodiment of a computer to which the present technology is applied.

DESCRIPTION OF EMBODIMENTS

A detailed description will be given below of specific embodiments to which the present technology is applied with reference to drawings.

<Conventional Signaling>

Before describing signaling to which the present technology is applied, conventional signaling will be described with reference to FIGS. 1 to 4.

Figure 1:
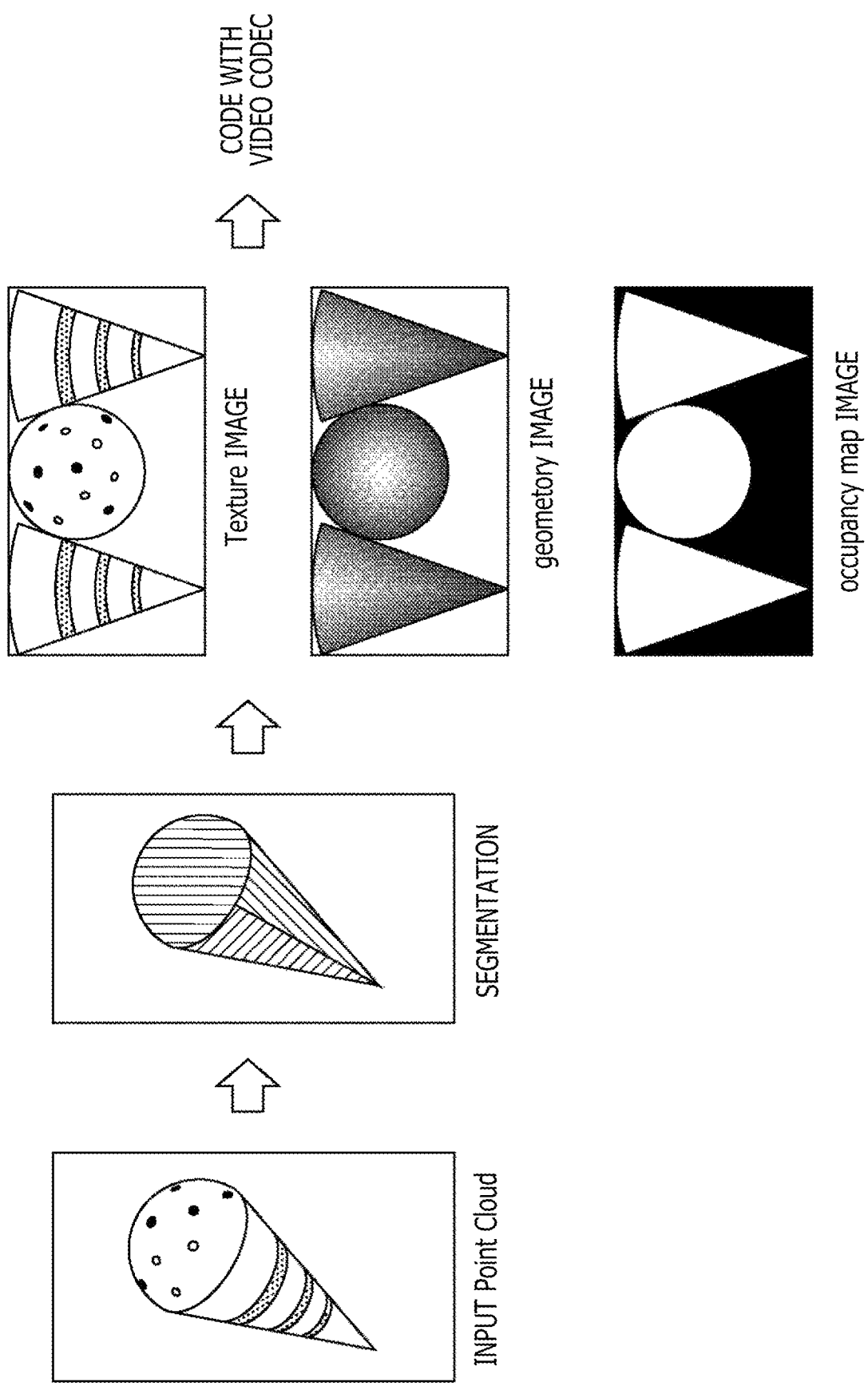
FIG. 1 is a diagram describing a point cloud compression method.

FIG. 1 is a diagram briefly describing V-PCC disclosed in the NPL 2 described above.

As illustrated in FIG. 1, point cloud data representing a three-dimensional structure (3D data) is input first, followed by segmentation of the point cloud content into plural regions. In the example illustrated in FIG. 1, point cloud data is input that represents a three-dimensional structure in which a hemispherical shape and a conical shape are combined, followed by segmentation of the point cloud content into three regions in which the hemispherical shape is divided into one region and the conical shape is divided into two regions.

Next, projection onto a plane for each region is performed, thus generating a texture image, a geometry image, and an occupancy map image. The texture image includes color information representing how a surface of each region looks. The geometry image includes position information representing a depth to the surface of each region. The occupancy map image includes patch position information within a component picture. Then, the texture image, the geometry image, and the occupancy map image are coded with a video codec such as AVC (Advanced Video Coding) or HEVC (High Efficiency Video Coding).

Figure 2:
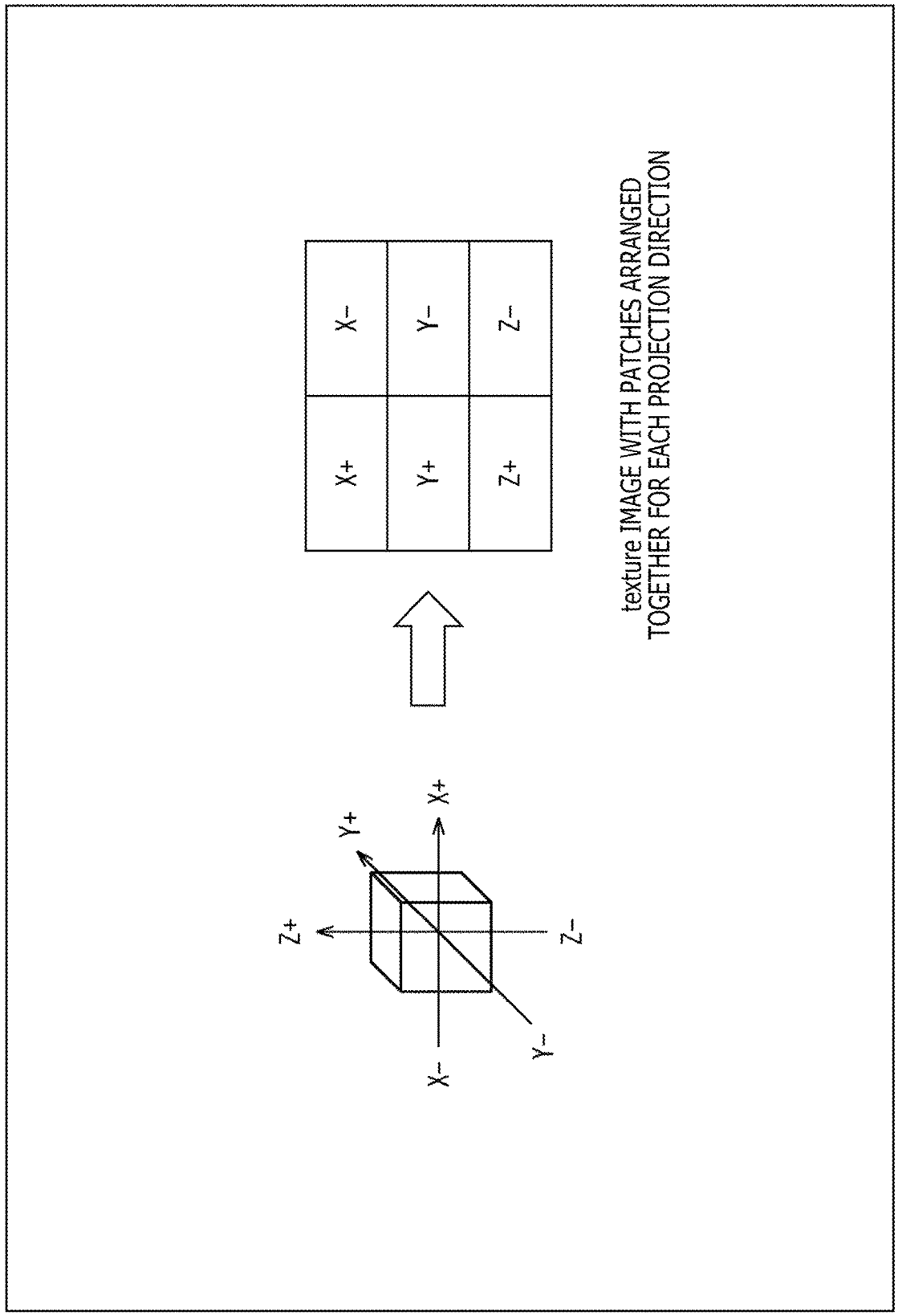
FIG. 2 is a diagram describing an image generated in a case where six projection planes are used.

Conventionally, it has been possible to generate, as illustrated in FIG. 2, a texture image with patches, the patches being projected onto six projection planes (X+ projection plane, X− projection plane, Y+ projection plane, Y− projection plane, Z+ projection plane, and Z− projection plane) and being arranged together for each projection direction. Also, it has been possible to generate a geometry image and an occupancy map image similarly with patches, the patches being projected onto the six projection planes and being arranged together for each projection direction.

Figure 3:
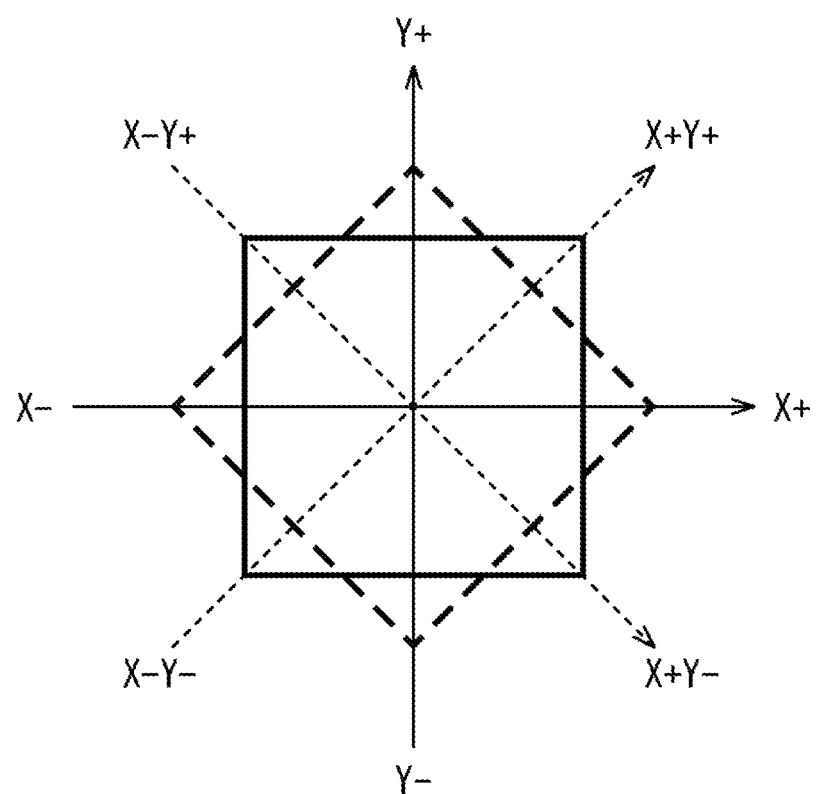
FIG. 3 is a diagram illustrating an example of setting up eight projection planes in a horizontal direction.

In contrast, a technique has been developed to generate a texture image, a geometry image, and an occupancy map image with 10 projection planes as disclosed in the NPL 3 described above. That is, as illustrated in FIG. 3, while four projection planes (solid lines) which are 90 degrees apart from each other have been used, other four projection planes (dashed lines) which are 45 degrees apart from these projection planes are added, providing a total of 10 projection planes including the two vertical planes.

For example, in the case of six projection planes, holes may be created on the surface of the reconstructed point cloud object as illustrated at the top in FIG. 4. In contrast, it is possible, by increasing the number of projection planes to 10, to fill the holes created in the case of six projection planes as illustrated at the bottom in FIG. 4 and reconstruct a point cloud object in such a manner as to prevent the creation of such holes in the surface, providing improved subjective image quality.

Figure 5:
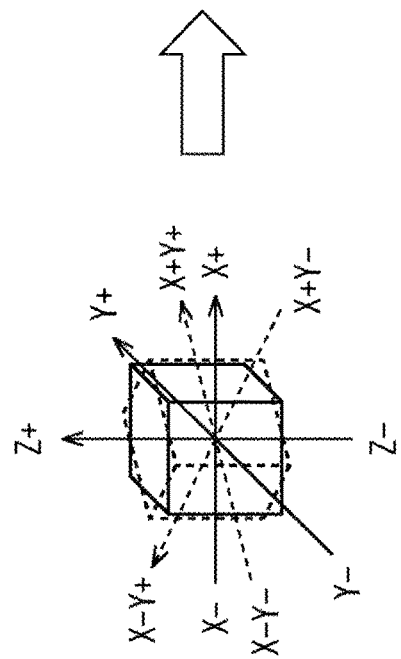
FIG. 5 is a diagram describing an image generated in a case where 10 projection planes are used.

Then, as illustrated in FIG. 5, it is possible to generate a texture image with patches, the patches being projected onto 10 projection planes (X+ projection plane, X− projection plane, Y+ projection plane, Y− projection plane, Z+ projection plane, Z− projection plane, X+Y+ projection plane, X−Y− projection plane, X−Y+ projection plane, and X+Y− projection plane) and being arranged together for each projection direction. Also, it is possible to generate a geometry image and an occupancy map image similarly with patches, the patches being projected onto the 10 projection planes and being arranged together for each projection direction.

Here, at the time of projection of a point cloud onto the projection planes, points of the point cloud projected onto the four conventional projection planes in the horizontal direction (X+ projection plane, X− projection plane, Y+ projection plane, and Y− projection plane) are also projected in an overlapping manner onto the four additional projection planes in the horizontal direction (X+Y+ projection plane, X−Y− projection plane, X−Y+ projection plane, and X+Y− projection plane).

Then, with respect to the projection onto the four additional projection planes, it depends upon encoder implementation whether to code, as overlapping information, all overlapping portions between the four additional projection planes and the four existing projection planes in the horizontal direction, including the all overlapping portions in the patches of the four additional projection planes, or to code, as overlapping information, only the difference from the four existing projection planes in the horizontal direction after deleting the overlapping portions from the patches of the four additional projection planes. For example, in a case where overlapping information is coded including the all overlapping portions described above in the patches of the four additional projection planes, all the patches projected onto the X+Y+ projection plane have all projection direction information of the X+Y+ projection plane. Meanwhile, in a case where overlapping information is coded by deleting the overlapping portions from the patches of the four additional projection planes, some of the patches projected onto the X+Y+ projection plane include only differential information lost in the patches of the X+ projection plane and the Y+ projection plane.

Accordingly, in the case where overlapping information is coded including the all overlapping portions described above in the patches of the four additional projection planes, it is possible to display divided streams of respective projection planes alone. Meanwhile, in the case where overlapping information is coded by deleting the overlapping portions from the patches of the four additional projection planes, it is impossible to display divided streams of respective projection planes alone.

That is, while it is possible to enhance the subjective image quality by increasing the number of projection planes to 10, the increased number of projection planes results in an increased number of patches in an image, resulting in an increased amount of information of the texture image, the geometry image, and the occupancy map image.

Also, it has conventionally been a precondition that an entire stream of each of the texture image, the geometry image, and the occupancy map image is acquired. For this reason, when V-PCC streams are delivered, bit rates inevitably increase in response to an increase in number of projection planes to 10 as compared to a stream of six projection planes.

Accordingly, as a result, interruption of reproduction is assumed, for example, in an environment of limited network bandwidth. If an attempt is made to reduce the bit rates and perform reproduction without interruption in the limited network bandwidth to deal with such a problem, there is a possibility that the image quality may degrade due to coding at reduced bit rates despite an increased number of projection planes for improved image quality.

For this reason, an effective approach to reduce delivery bit rates would be to deliver a V-PCC stream (texture stream, geometry stream, and occupancy map stream) in a divided manner for each projection plane and select and acquire the divided V-PCC stream of a necessary projection plane according to a user's viewing direction.

Even in this case, however, it is impossible to identify whether or not the patches of the four additional projection planes (X+Y+ projection plane, X−Y− projection plane, X−Y+ projection plane, and X+Y− projection plane) have all information of the respective projection planes. This makes it impossible to determine whether an image can be displayed alone, constantly acquiring streams on the precondition that not all information in the projection directions is available.

For example, in a case where the user's viewing direction corresponds to a divided stream of the projection direction X+Y+, and even in a case where the divided stream has all information of the projection direction and it is possible to configure point cloud content of the projection direction only with that stream, divided streams in the projection direction X+ and the projection direction Y+ which are the neighboring directions of the projection direction X+Y+ are acquired. As described above, divided streams that are otherwise unnecessary are acquired to achieve display, possibly resulting in interruption of reproduction or degraded image quality and increased processing overhead on the client side.

For this reason, there is a demand to deliver V-PCC streams enhanced in image quality by adding projection planes while, at the same time, reducing increase in client's throughput by achieving effective use of network bandwidth made possible by division of a V-PCC stream and delivery of streams required only to achieve display. This requires means of providing, to the client, information regarding additional planes, i.e., projection direction information of patches in the divided V-PCC streams and display-alone-yes/no information indicating whether or not the divided streams can be displayed alone.

The present disclosure proposes means of generating a file including information regarding additional planes as described above and presenting the file to a client. As a specific embodiment thereof, a description will be given below of an extension method (DASH MPD extension, ISOBMFF extension, or Elementary Stream extension). Also, the present disclosure proposes means of providing, as Image quality metadata, effective pixel information of the V-PCC stream, which is information effective for enhancing the image quality, to the client to enhance the image quality of a V-PCC stream in the viewing direction.

Here, before describing the extension method, a description will be given below of an advantageous effect of providing projection direction information and display-alone-yes/no information to the client with reference to FIGS. 6 and 7.

Figure 6:
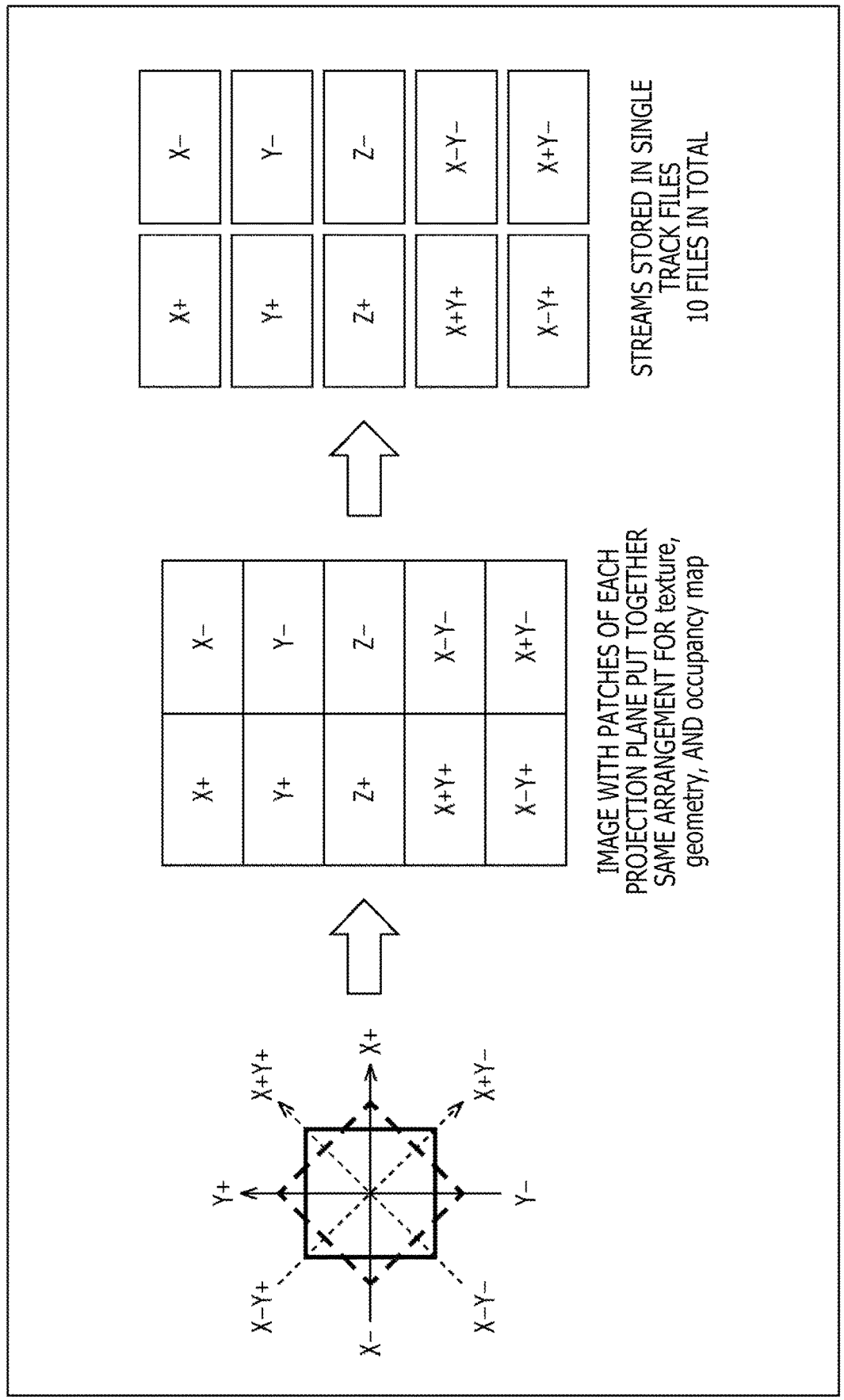
FIG. 6 is a diagram describing generation of files in a case where 10 projection planes are used.

As illustrated in the middle in FIG. 6, for example, a texture image, a geometry image, and an occupancy map image are generated by putting together the patches projected onto 10 projection planes (X+ projection plane, X− projection plane, Y+ projection plane, Y− projection plane, Z+ projection plane, Z− projection plane, X+Y+ projection plane, X−Y− projection plane, X−Y+ projection plane, and X+Y− projection plane) in the same arrangement for each projection direction, and auxiliary information is generated that includes projection metadata including projection direction information and display-alone-yes/no information.

Thereafter, as illustrated on the right in FIG. 6, each generated image is divided for each projection direction and coded, thus generating a texture stream, a geometry stream, and an occupancy map stream for each projection direction. Then, a projection direction file (ISOBMFF: ISO Base Media File Format) is generated that stores these streams and the auxiliary information.

For example, a projection direction file can include a single track that stores a single stream generated by putting together not only the texture stream, the geometry stream, and the occupancy map stream for each projection direction but also the auxiliary information. Also, a projection direction file can include four tracks that each store the texture stream, the geometry stream, and the occupancy map stream for each projection direction and the auxiliary information. As described above, 10 projection direction files corresponding to the respective projection directions are generated by generating a projection direction file for each projection direction.

As described above, a projection direction file includes auxiliary information, and projection direction information indicating the projection direction of that file and display-alone-yes/no information indicating whether or not display can be achieved only with that file are added to auxiliary information. Accordingly, the client can select and acquire, on the basis of the above information, a necessary file for reproduction according to the viewing direction, create a point cloud, and display the point cloud.

Meanwhile, an arrow "view" illustrated in A of FIG. 7 indicates the viewing direction, and a description will be given of an example of acquiring a file when the user's viewing direction is in the vicinity of the projection direction X+Y+.

For example, in a case where display-alone-yes/no information indicates that the stream can be displayed alone, the client acquires projection direction files of six projection directions, i.e., four projection directions illustrated in B of FIG. 7 plus two projection directions in the Z direction (projection direction X+Y+, projection direction X−Y−, projection direction X−Y+, projection direction X+Y−, projection direction Z+, and projection direction Z−). In contrast, in a case where display-alone-yes/no information indicates that the stream cannot be displayed alone, the client acquires projection direction files of seven projection directions, i.e., five projection directions illustrated in C of FIG. 7 plus two projection directions in the Z direction (projection direction X+Y+, projection direction Y+, projection direction X−, projection direction Y−, projection direction X+, projection direction Z+, and projection direction Z−).

As described above, the number of files acquired by the client is fewer than 10 files of a case where there is no projection metadata, and the subjective image quality in the viewing direction is comparable regardless of whether or not display-alone-yes/no information indicates that the stream can be displayed alone. That is, it is possible to deliver a V-PCC stream enhanced in image quality by adding projection planes while, at the same time, reducing processing overhead on the client side by achieving effective use of network bandwidth.

<First Extension Method>

A description will be given of a first extension method of signaling, through DASH MPD (Dynamic Adaptive Streaming over HTTP Media Presentation Description) extension, projection direction information, display-alone-yes/no information, and image quality metadata for each file referred to, with reference to FIGS. 8 to 21.

For example, projection metadata includes projection direction information and display-alone-yes/no information. Display-alone-yes/no information indicates whether or not the texture stream, the geometry stream, and the occupancy map stream included in the file can be displayed alone, and there are two method to signal that information, a first signaling method and a second signaling method, which will be described below.

<First Signaling Method in the First Extension Method>

The first signaling method signals with a flag which indicates whether or not the texture stream, the geometry stream, and the occupancy map stream included in the file can be displayed alone.

As illustrated in the MPD sample of FIG. 8, a projection direction descriptor (SupplementalProperty of schemeIdUri="urn:mpeg:mpegI:pc_proj_direction:2018") is newly defined and signaled as projection direction information of the divided V-PCC streams. Here, @value signals projection direction information of a patch inside a stream.

For example, the projection direction relative to a point cloud's local coordinate system is signaled with @value (0 to 9). That is, in a case where @value=0, the projection direction X+ is signaled, in a case where @value=1, the projection direction Y+ is signaled, in a case where @value=2, the projection direction X− is signaled, in a case where @value=3, the projection direction Y− is signaled, in a case where @value=4, the projection direction Z+ is signaled, in a case where @value=5, the projection direction Z− is signaled, in a case where @value=6, the projection direction X+Y+ is signaled, in a case where @value=7, the projection direction X−Y+ is signaled, in a case where @value=8, the projection direction X−Y− is signaled, and in a case where @value=9, the projection direction X+Y− is signaled.

It should be noted that a single divided V-PCC stream may include patches of a plurality of projection directions. In this case, the plurality of projection directions is signaled, for example, by comma separation in @value.

As illustrated in the MPD sample of FIG. 8, a present alone descriptor (SupplementalProperty of schemeIdUri="urn:mpeg:mpegI:pc_present_alone:2018") is newly defined and signaled as display-alone-yes/no information of the divided V-PCC stream. Here, 0 or 1 is specified as @value, and in a case where @value=0, this indicates that the divided stream cannot be displayed alone, and in a case where @value=1, this indicates that the divided stream can be displayed alone.

For example, the example illustrated in FIG. 8 depicts that a divided stream including patches projected in the projection direction X+ and the projection direction Y+ can be displayed alone and that a divided stream including a patch projected in the projection direction X+Y+ cannot be displayed alone.

It should be noted that a single divided V-PCC stream may include a patch that can be displayed alone and another patch that cannot be displayed alone. In this case, @value of the present alone descriptor is 0.

Also, a group of divided V-PCC streams included in a single point cloud newly defines and signals a point cloud group descriptor (SupplementalProperty of schemeIdUri="urn:mpeg:mpegI:pc_group:2018"). Here, @value signals a grouping identifier, and divided V-PCC streams having the same value are included in a single point cloud.

For example, in a case where the user's viewing direction is in the vicinity of the projection direction X+Y+ and only the point cloud as seen from that direction is reconstructed, the client selects AdaptationSet@id=vpcc45 by referring to the projection direction descriptor. Then, the client can identify, from the present alone descriptor, that the stream can be displayed alone, thus selecting AdaptationSet@id=vpcc0 and AdaptationSet@id=vpcc90, which are the neighboring directions. As described above, the client can display a point cloud covering the viewing direction by acquiring three AdaptationSets.

Also, for example, in a case where the user's viewing direction is in the vicinity of the projection direction X+, the client can identify that he or she simply needs to select and acquire only AdaptationSet@id=vpcc0, thus eliminating the need to acquire other excess divided streams to cover the viewing direction.

Figure 9:
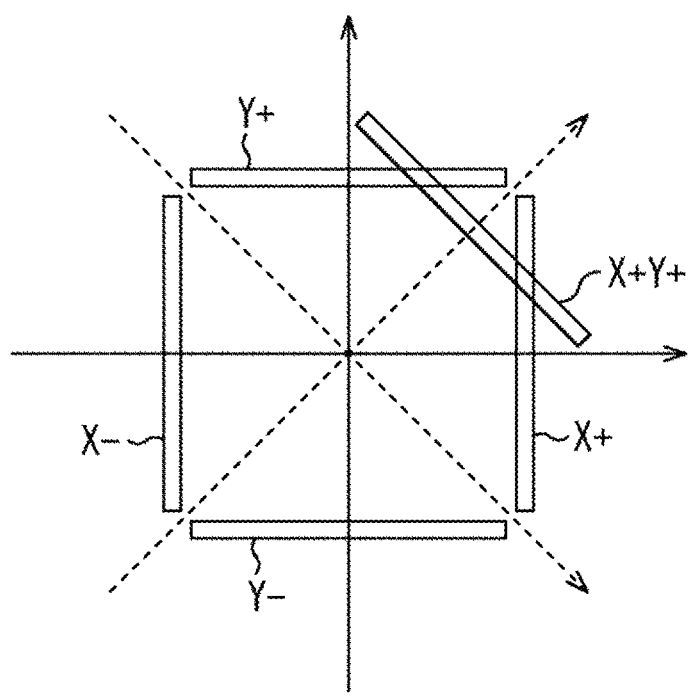
FIG. 9 is a diagram describing an example of acquiring a stream.

It should be noted that divided V-PCC streams included in a point cloud on a rear surface invisible from the viewing direction may be further acquired. At this time, holes on the rear surface of the point cloud are permitted. Therefore, the delivery bit rate can be reduced by acquiring only the minimum required number of divided streams. For example, in a case where the stream of the projection direction X+Y+ cannot be displayed alone when the user's viewing direction is in the vicinity of the projection direction X+Y+, it is only necessary to acquire the streams of five projection directions in the horizontal direction (X+Y+ projection plane, X+ projection plane, Y+ projection plane, X projection plane, and Y− projection plane) as illustrated in FIG. 9.

As described above, the projection direction descriptor and the present alone descriptor allow for effective delivery according to the viewing direction of the V-PCC stream.

It should be noted that a newly defined descriptor may be signaled by using EssentialProperty.

At this time, a DASH client that does not support schemeIdUri of EssentialProperty must ignore Preselection and Adaptation Set (or Representation, etc., in some cases) written in this Property. Also, a DASH client that does not support schemeIdUri of SupplementalProperty may ignore this Property's value and use its Preselection and AdaptationSet (or Representation, etc., in some cases).

<Second Signaling Method in the First Extension Method>

The second signaling method signals association with a file required to achieve display in a case where the texture stream, the geometry stream, and the occupancy map stream included in the file cannot be displayed alone.

First, association of Representation of a divided stream that cannot be displayed alone with Representation of a divided stream that has information required to achieve the display is carried out by Representation@dependencyId. That is, Representation@dependencyId is used as display-alone-yes/no information of divided V-PCC streams. For example, in the presence of Representation@dependencyId, this indicates that the divided stream cannot be displayed alone, and in the absence of Representation@dependencyId, this indicates that the divided stream can be displayed alone.

FIG. 10 is a diagram illustrating an MPD sample in the second signaling method. The second signaling method provides an advantageous effect similar to the first signaling method described above.

Also, a group that can be displayed alone may be signaled by defining a new descriptor. For example, the projection direction X+Y+ that cannot be displayed alone nay be grouped together with the projection direction X+ and the projection direction Y+ required to achieve the display to indicate that the streams can be displayed alone on a group-by-group basis.

<Further Extension of the First Extension Method>

A description will be given here of further extension of the first extension method.

As described above, the first extension method allows for extension of the conventional DASH MPD in such a manner that projection direction information is available. Moreover, the DASH MPD can be further extended such that the four additional projection planes (X+Y+ projection plane, X−Y− projection plane, X−Y+ projection plane, and X+Y− projection plane) have additional projection direction identification information that indicates that the image has been generated from patches of the four additional projection directions.

For example, as illustrated in the MPL sample of FIG. 11, a 45 degree projection descriptor (SupplementalProperty of schemeIdUri="urn:mpeg:mpegI:pc_45 degree_projection: 2018") is newly defined and signaled as additional projection direction identification information of a projection direction file. Here, @value=0 in the 45 degree projection descriptor indicates that the stream has been generated from patches of six projection directions, and @value=1 indicates that the stream has been generated from patches of four additional projection directions.

Also, the projection direction descriptor signals the projection direction relative to the point cloud's local coordinate system with @value(0-5). That is, in a case where @value=0, the projection direction X+ is signaled, in a case where @value=1, the projection direction Y+ is signaled, in a case where @value=2, the projection direction X− is signaled, in a case where @value=3, the projection direction Y− is signaled, in a case where @value=4, the projection direction Z+ is signaled, and in a case where @value=5, the projection direction Z− is signaled.

It should be noted that, as illustrated in the MPD sample of FIG. 11, signaling the 45 degree projection descriptor and the projection direction descriptor in each Adaptation Set renders an MPD equivalent to the MPD sample illustrated in FIG. 8.

That is, in a case where it is indicated by @value=1 of the 45 degree projection descriptor that the image has been generated from patches of the four additional projection directions, it is indicated that the projection direction is the direction rotated counterclockwise 45 degrees about the Z axis in the direction indicated by @value of the projection direction descriptor. For example, as illustrated in Adaptation Set of @id="vpcc45," @value=0 of the projection direction descriptor signaled together with the 45 degree projection descriptor of @value=1 indicates that the projection direction is X+Y+.

Also, in a case where a 45 degree projection descriptor is not signaled, this may indicate that the stream has been generated from patches of six projection directions. Meanwhile, in a case where a 45 degree projection descriptor is signaled, this may indicate that the stream has been generated from patches of four projection directions.

Further, only a 45 degree projection descriptor may be signaled without signaling a projection direction descriptor. In this case, if @value=0 in the 45 degree projection descriptor, this indicates that the stream has been generated from patches of all six projection directions, and if @value=1, this indicates that the stream has been generated from patches of all four additional projection directions.

Here, in a case where it is possible to partially access individual blocks into which an object box is divided as disclosed in the NPL 4 described above, a projection direction file may be generated on the basis of each block. For example, the object box is in the shape of a rectangular parallelepiped that includes the entire point cloud object and can be divided by blocks in the shape of a rectangular parallelepiped smaller than the object box.

Figure 12:
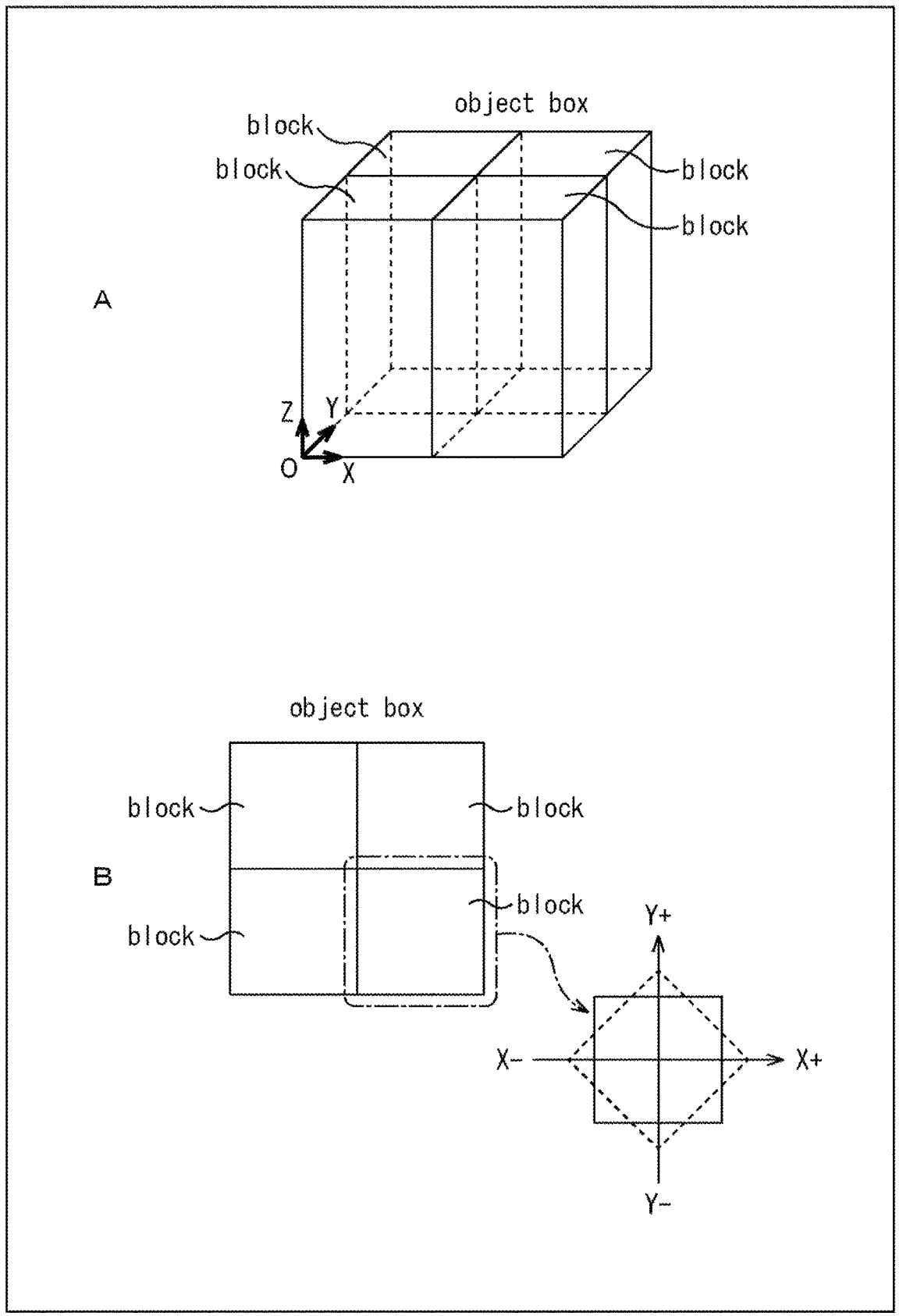
FIG. 12 depicts diagrams describing an object box and blocks.

FIG. 12 illustrates an example in which an object box is divided by four blocks. For example, the object box has the X, Y, and Z axes set as illustrated in A of FIG. 12 and can be divided by four blocks such that the blocks are arranged two by two along the X axis direction and the Y axis direction as seen from the Z axis direction as illustrated in B of FIG. 12. Then, it is possible to add four projection planes (dashed lines) whose projection directions are each shifted 45 degrees relative to one of the four projection planes (solid lines) of the blocks as illustrated at the bottom right in B of FIG. 12.

Also, in a case where a projection direction file is generated for each block, a 45 degree projection descriptor signaled for each block can be used together with block position information for identifying three-dimensional space information of each block.

That is, as illustrated in the MPD sample of FIG. 13, a projection direction descriptor, a 45 degree projection descriptor, and a block information descriptor are signaled in each Adaptation Set. Here, the block information descriptor (SupplementalProperty of schemeIdUri="urn:mpeg:mepgI: gpcc:block_information:2018") signals three-dimensional space information of a block. For example, three-dimensional space information of the block can be indicated by block_offset_x, block_offset_y, block_offset_z, block_size_x, block_size_y, and block_size_z, which are attributes of a gpcc:blockInfo element. Also, the blocks having the same object_id attribute indicate that these blocks are included in the same object box.

Figure 14:
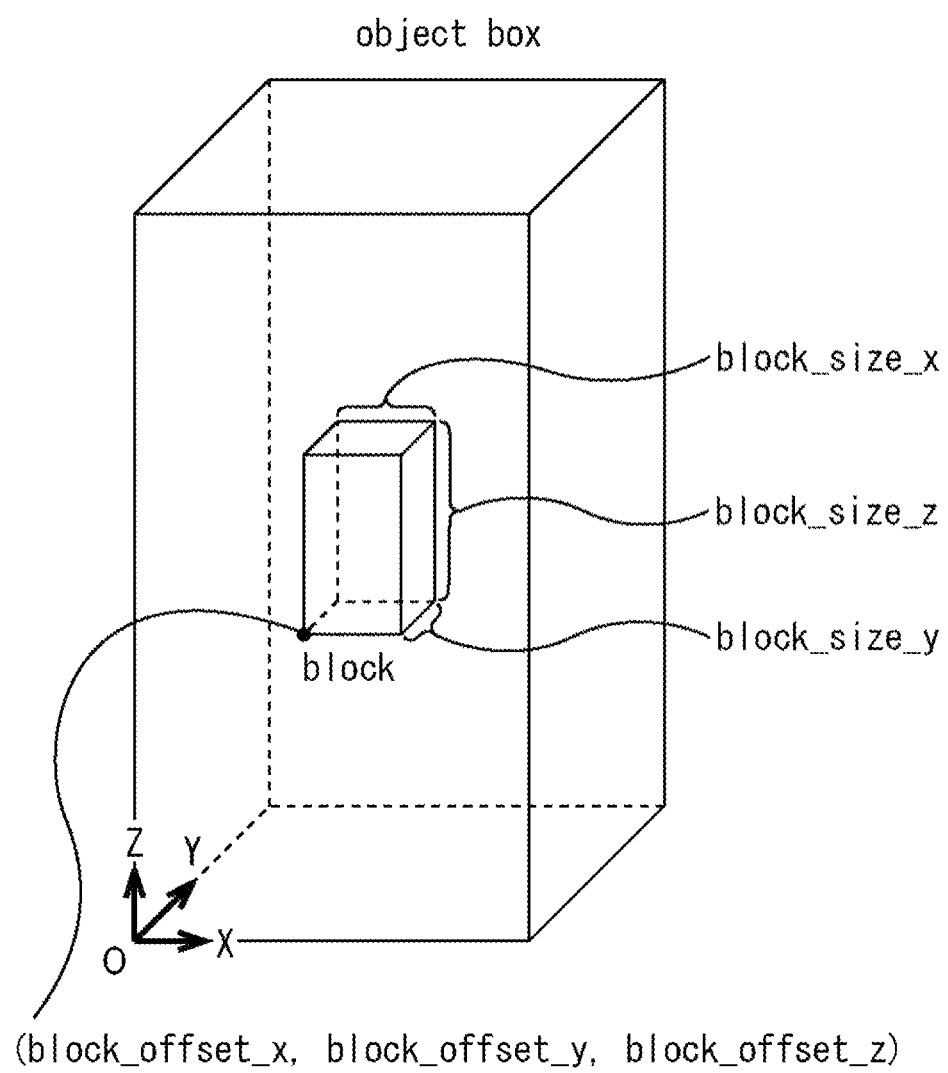
FIG. 14 is a diagram describing each attribute of a gpcc:blockInfo element.

Here, each attribute of the gpcc:blockInfo element is signaled by a relative value obtained by assuming that each of the sides along the X, Y, and Z axes of the object box is 1 as illustrated in FIG. 14.

It should be noted that only a 45 degree projection descriptor and a block information descriptor may be signaled without signaling a projection direction descriptor. In this case, if @value=0 in the 45 degree projection descriptor, this indicates that the projection direction file of each block is a stream generated from patches of all six projection directions, and if @value=1, this indicates that the projection direction file of each block is a stream generated from patches of all four additional projection directions.

As described above, the first extension method allows for extension of the MPD in such a manner that additional projection direction identification information is signaled in addition to projection direction information.

<Configuration Example of the Information Processing Apparatus>

Figure 15:
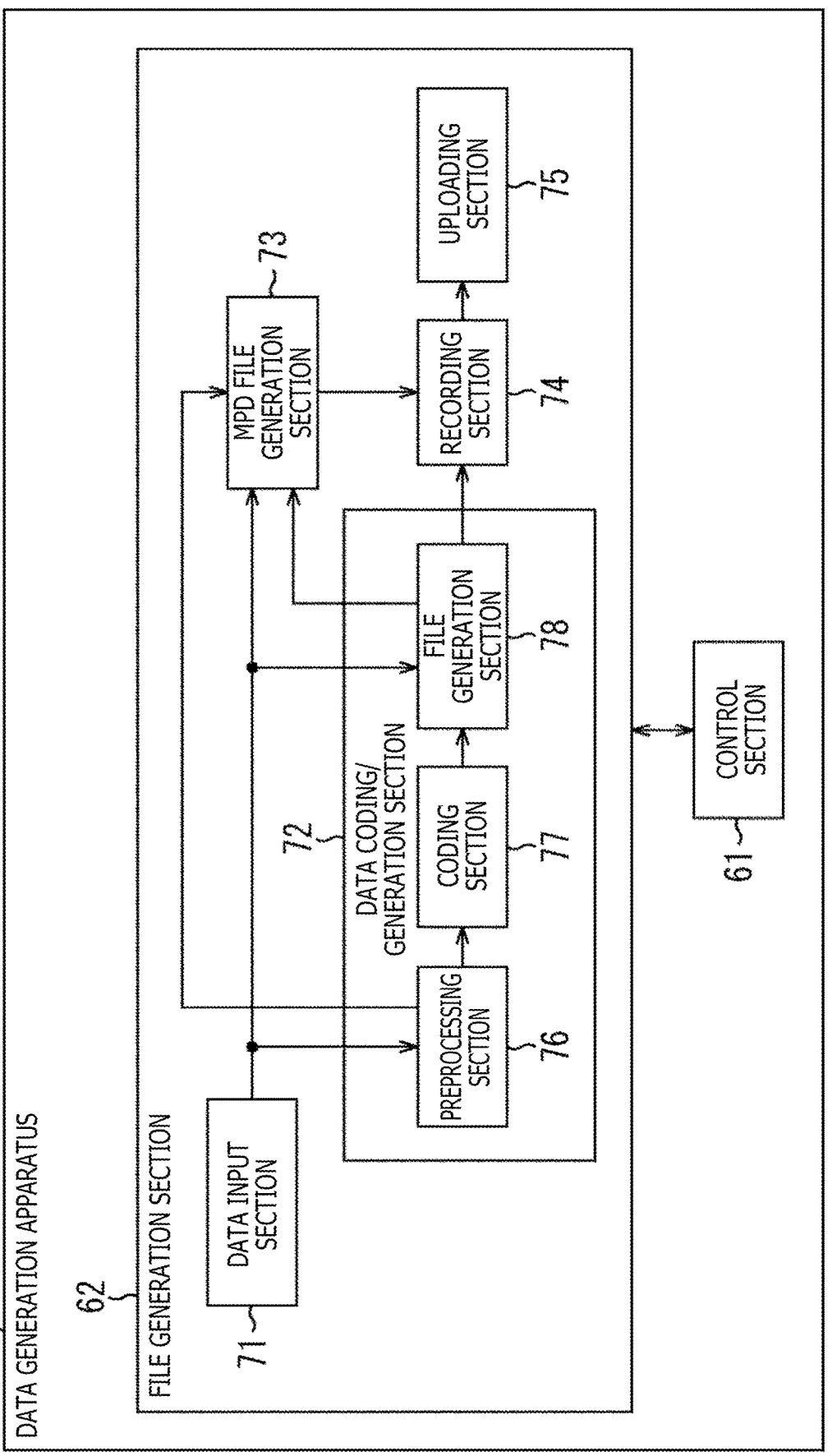
FIG. 15 is a block diagram illustrating a configuration example of a data generation apparatus.

FIG. 15 is a block diagram illustrating a configuration example of a data generation apparatus which is an information processing apparatus that generates a PC stream from point cloud data on a server side that provides content and performs a file generation process of generating a file that stores the PC stream in the ISOBMFF.

A data generation apparatus 51 illustrated in FIG. 15 includes a control section 61 and a file generation section 62. The data generation apparatus 51 generates a V-PCC stream's segment file and an MPD file delivered by MPEG-DASH or the like and uploads these files to a server.

The control section 61 controls all actions of the data generation apparatus 51. For example, the control section 61 controls the file generation section 62 to generate a segment file storing a V-PCC stream and an MPD file including metadata and upload the segment file and the MPD file.

The file generation section 62 not only generates, under control of the control section 61, a segment file and an MPD file but also uploads (sends) the segment file and the MPD file to the server via a network.

The file generation section 62 includes a data input section 71, a data coding/generation section 72, an MPD file generation section 73, a recording section 74, and an uploading section 75.

The data input section 71 not only acquires point cloud data and supplies the data to the data coding/generation section 72 but also acquires metadata required to generate an MPD file and supplies the metadata to the MPD file generation section 73.

The data coding/generation section 72 not only generates a texture image, a geometry image, and an occupancy map image on the basis of the point cloud data supplied from the data input section 71 but also generates a segment file storing their V-PCC streams and supplies the segment file to the recording section 74.

The data coding/generation section 72 includes a preprocessing section 76, a coding section 77, and a file generation section 78.

The preprocessing section 76 not only generates a texture image, a geometry image, and an occupancy map image on the basis of the point cloud data supplied from the data input section 71 but also projection metadata (projection direction information and display-alone-yes/no information) and image quality metadata and supplies the images and the data described above to the coding section 77. Further, the preprocessing section 76 divides the texture image, the geometry image, and the occupancy map image for each projection direction as described with reference to FIG. 6.

The coding section 77 encodes the texture image, the geometry image, and the occupancy map image supplied from the preprocessing section 76, generates divided V-PCC streams (i.e., texture stream, geometry stream, and occupancy map stream divided for each projection direction and auxiliary information including projection metadata (projection direction information and display-alone-yes/no information) and supplies these pieces of information to the file generation section 78.

The file generation section 78 converts the divided V-PCC streams which are supplied from the coding section 77 into a file on the basis of metadata supplied from the data input section 71 and the like and supplies the segment file obtained as a result thereof to the recording section 74. It should be noted that the file generation section 78 may acquire metadata and the like required to generate a segment file from the coding section 77 or extract such metadata from the divided V-PCC streams.

The MPD file generation section 73 generates an MPD file including information regarding point cloud data and V-PCC streams that include the point cloud data on the basis of the metadata supplied from the data input section 71 and the like and supplies the file to the recording section 74. That is, the MPD file generation section 73 generates an MPD file that signals projection metadata (projection direction information and display-alone-yes/no information). It should be noted that the MPD file generation section 73 may acquire metadata required to generate an MPD file and the like from the file generation section 78 or extract such metadata from a segment file.

The recording section 74 records the MPD file supplied from the MPD file generation section 73 and the segment file supplied from the file generation section 78.

The uploading section 75 reads out the MPD file and the segment file of the point cloud data from the recording section 74 and uploads the files to the server. That is, the uploading section 75 functions as a communication section for sending the MPD file and the segment file to the server.

It should be noted that, although an example will be described here in which the data generation apparatus 51 functions as an apparatus for uploading an MPD file and a segment file to the server, the data generation apparatus 51 may function as a server. In such a case, the uploading section 75 of the data generation apparatus 51 sends an MPD file and a segment file to a client apparatus via a network.

Figure 16:
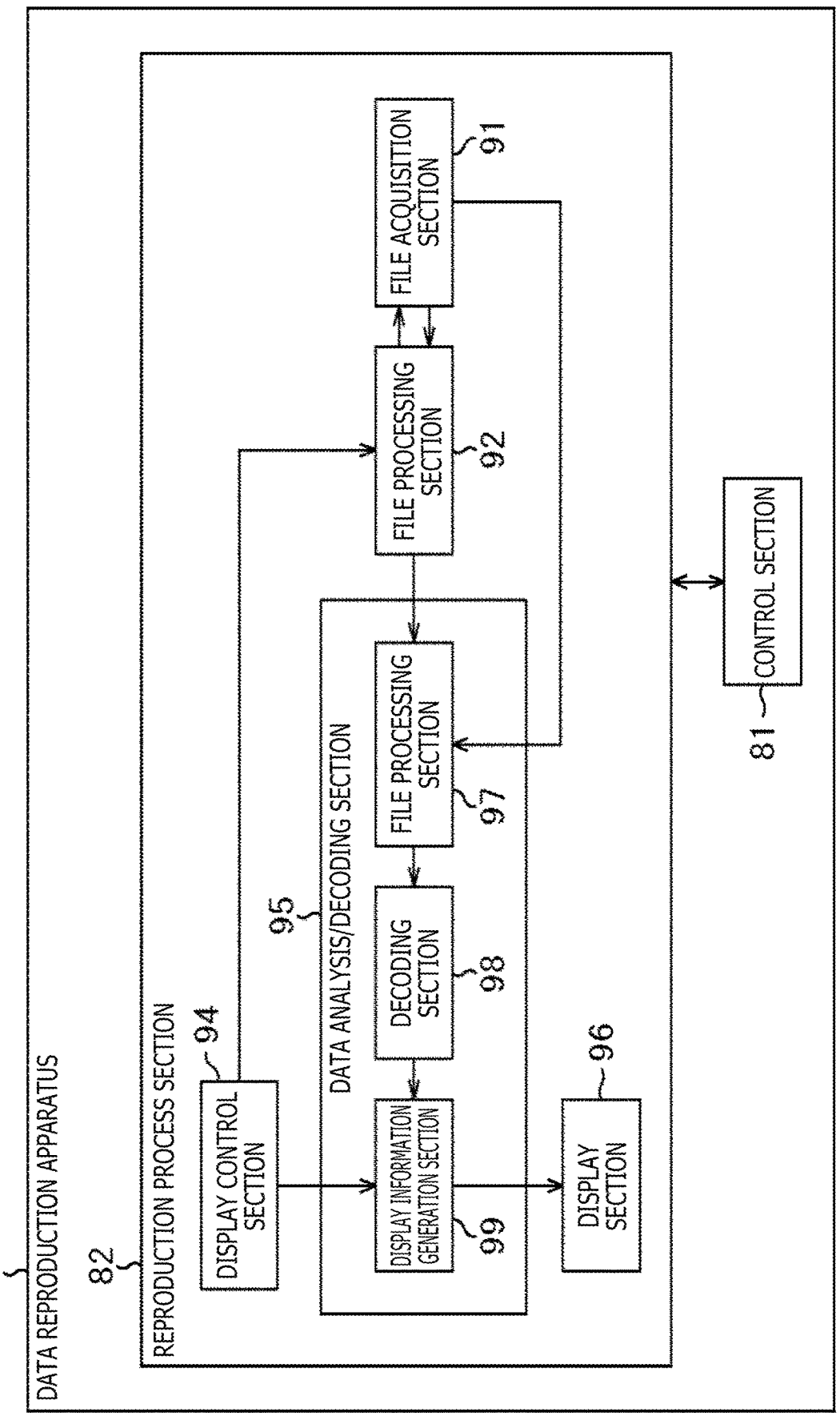
FIG. 16 is a block diagram illustrating a configuration example of a data reproduction apparatus.

FIG. 16 is a block diagram illustrating a configuration example of a data reproduction apparatus which is an information processing apparatus that performs a point cloud reproduction process of generating a display image from files and reproducing point cloud data on the client side that reproduces content.

A data reproduction apparatus 52 illustrated in FIG. 16 is a DASH client and includes a control section 81 and a reproduction process section 82.

The control section 81 controls all actions of the data reproduction apparatus 52. For example, the control section 81 controls the reproduction process section 82 to acquire an MPD file and a segment file from the server and reproduce point cloud data on the basis of the segment file.

The reproduction process section 82 reproduces point cloud data under control of the control section 81. The reproduction process section 82 includes a file acquisition section 91, a file processing section 92, a display control section 94, a data analysis/decoding section 95, and a display section 96.

The file processing section 92 selects V-PCC streams to acquire on the basis of the MPD file supplied from the file acquisition section 91 and feeds the selection result thereof back to the file acquisition section 91. It should be noted that a direction of user's field of view (e.g., viewpoint position, direction of line of sight, angle of field of view) supplied from the display control section 94 and the like are used as appropriate to select V-PCC streams to acquire.

The file acquisition section 91 acquires, from the server, a segment file storing the V-PCC streams required to reproduce point cloud data on the basis of the selection result supplied from the file processing section 92 and supplies the segment file to a file processing section 97 of the data analysis/decoding section 95.

The display control section 94 controls the reproduction (display) of point cloud data. For example, the display control section 94 acquires the detection result of the direction of the field of view of the user viewing a point cloud and supplies the detection result to the file processing section 92 and the data analysis/decoding section 95.

The data analysis/decoding section 95 generates an image of a 3D model which is point cloud data, on the basis of the segment file supplied from the file acquisition section 91, and supplies the image to the display section 96. The data analysis/decoding section 95 includes a file processing section 97, a decoding section 98, and a display information generation section 99.

The file processing section 97 extracts coded data of the V-PCC streams from the segment file supplied from the file acquisition section 91 and supplies the coded data to the decoding section 98.

The decoding section 98 decodes the coded data supplied from the file processing section 97 and supplies the V-PCC streams obtained as a result thereof to the display information generation section 99.

The display information generation section 99 reconfigures point cloud data from the V-PCC streams supplied from the decoding section 98, generates point cloud image data according to the direction of the user's field of view on the basis of the detection result of the direction of the user's field of view supplied from the display control section 94, and supplies the point cloud image data to the display section 96.

The display section 96 includes, for example, a liquid crystal display panel and displays (reproduces) the point cloud image on the basis of the data supplied from the display information generation section 99.

<Processing Examples of the File Generation Process and the Point Cloud Reproduction Process>

Figure 17:
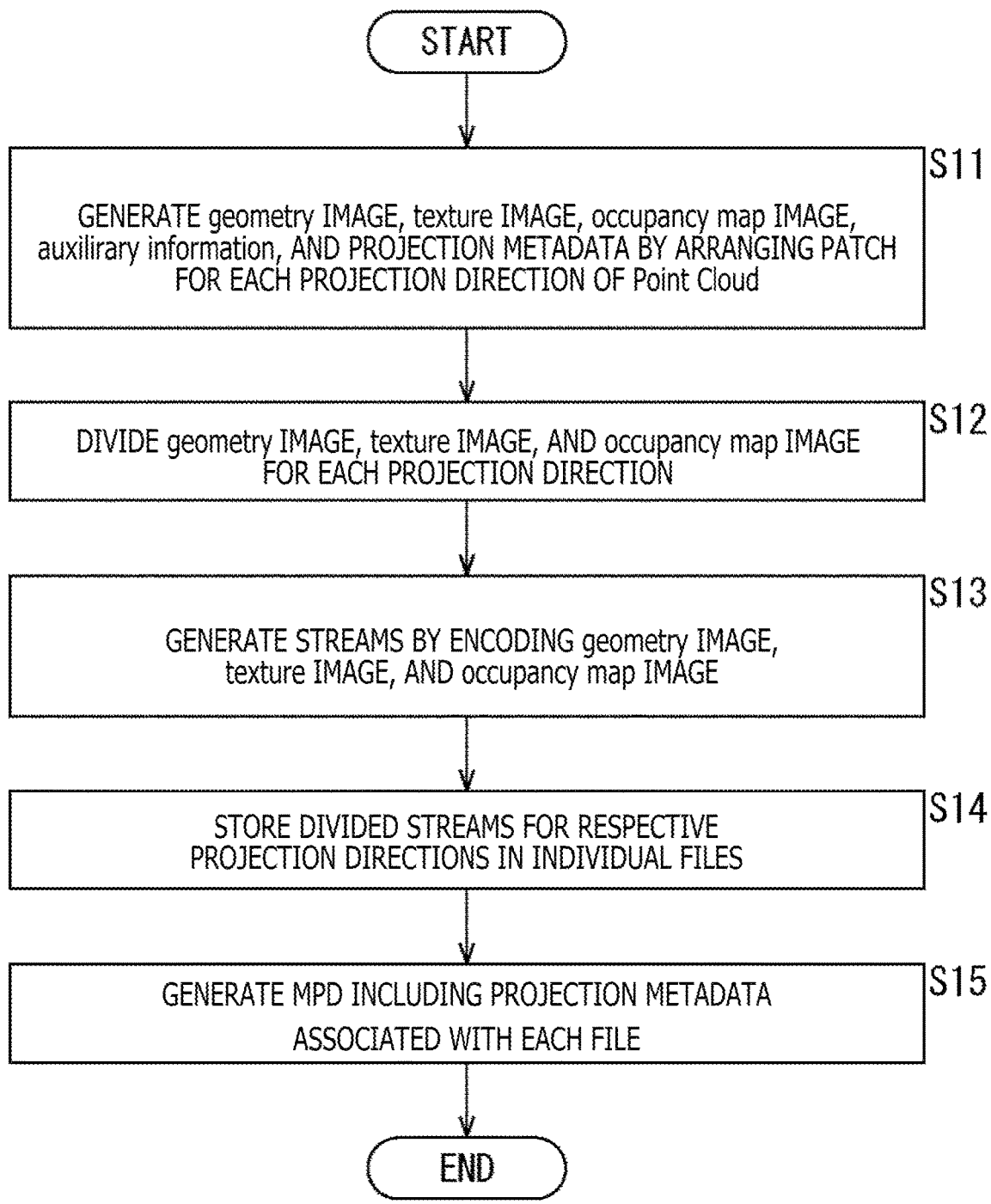
FIG. 17 is a flowchart describing a file generation process.

FIG. 17 is a flowchart describing a file generation process in which the data generation apparatus 51 illustrated in FIG. 15 generates a file from point cloud data.

For example, the process is initiated when point cloud data is input to the data generation apparatus 51. In step S11, the preprocessing section 76 arranges a patch for each projection direction of the point cloud and generates a texture image, a geometry image, and an occupancy map image and auxiliary information. Also, at this time, the preprocessing section 76 generates projection metadata (projection direction information and display-alone-yes/no information) for each projection direction.

In step S12, the preprocessing section 76 divides the texture image, the geometry image, and the occupancy map image for each projection direction and supplies the divided images to the coding section 77.

In step S13, the coding section 77 encodes the texture image, the geometry image, and the occupancy map image and adds auxiliary information, thus generating streams and supplying the streams to the file generation section 78.

In step S14, the file generation section 78 stores the divided streams for respective projection directions in individual files and supplies the segment file obtained as a result thereof to the recording section 74.

In step S15, the MPD file generation section 73 generates an MPD to which projection metadata (projection direction information and display-alone-yes/no information) associated with each file generated by the file generation section 78 has been added, supplying the MPD to the recording section 74, after which the file generation process is terminated. Thereafter, the uploading section 75 reads out the MPD file and the segment file from the recording section 74 at a desired timing and uploads the files to the server.

Figure 18:
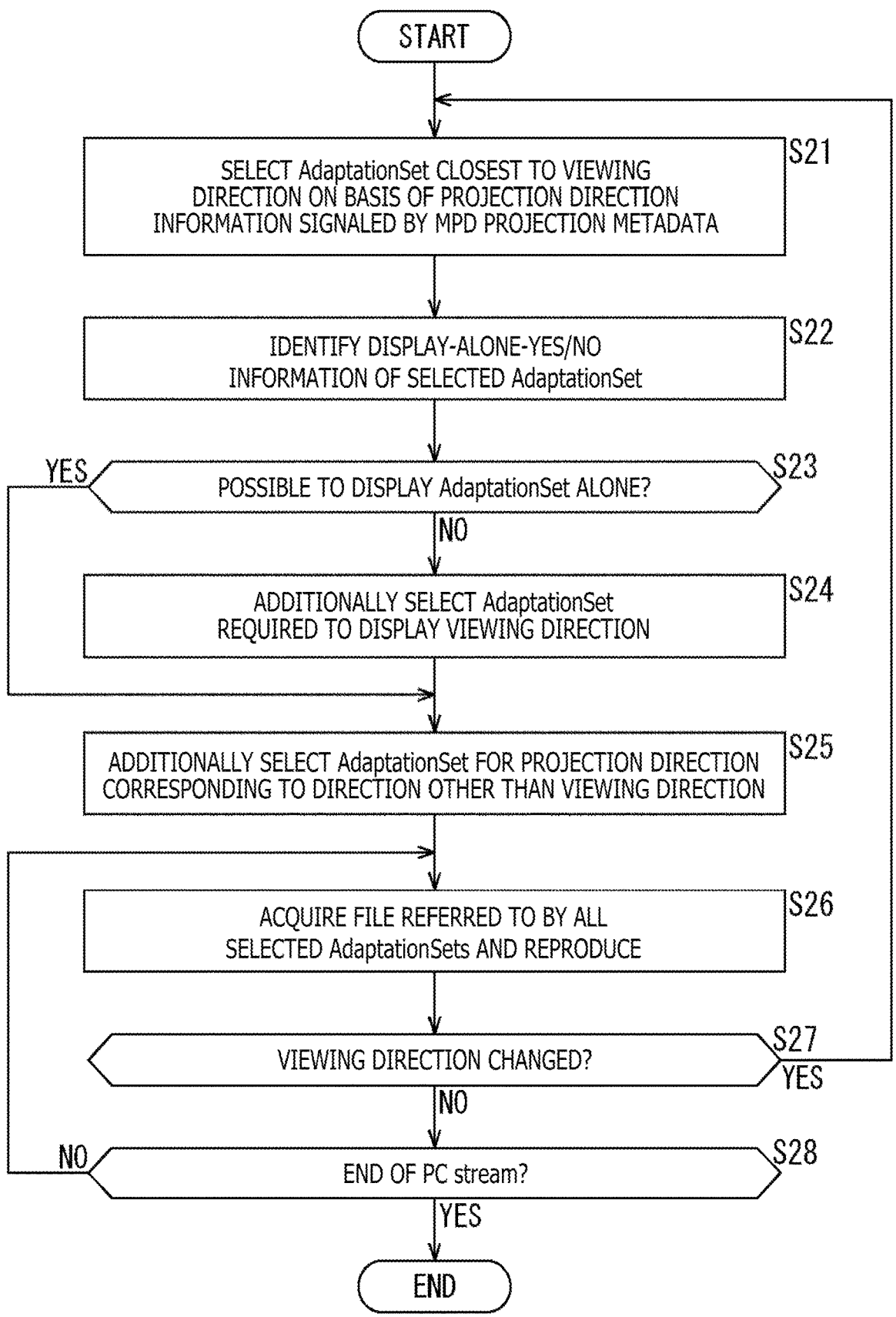
FIG. 18 is a flowchart describing a point cloud reproduction process.

FIG. 18 is a flowchart describing the point cloud reproduction process in which the data reproduction apparatus 52 illustrated in FIG. 16 generates and reproduces a display image from files.

For example, the process is initiated when the supply of the file to the data reproduction apparatus 52 begins from the beginning of the file, and, in step S21, the file acquisition section 91 selects the AdaptationSet closest to the user's viewing direction on the basis of the projection direction information signaled by projection metadata of the MPD (projection direction information and display-alone-yes/no information).

In step S22, the file processing section 92 identifies the display-alone-yes/no information of the AdaptationSet selected by the file acquisition section 91 in step S21.

In step S23, the file processing section 92 determines whether or not the AdaptationSet can be displayed alone according to the identification result in step S23.

In a case where the file processing section 92 determines, in step S23, that the AdaptationSet cannot be displayed alone, the process proceeds to step S24. In step S24, the file acquisition section 91 additionally selects the AdaptationSet required to display the direction of the user's viewing direction, and then the process proceeds to step S25.

Meanwhile, in a case where the file processing section 92 determines, in step S23, that the AdaptationSet can be displayed alone, the process proceeds to step S25.

In step S25, the file acquisition section 91 additionally selects the AdaptationSet for a projection direction corresponding to a direction other than the direction of the user's viewing direction.

In step 326, the file acquisition section 91 acquires the files referred to by all the AdaptationSets selected, and the data analysis/decoding section 95 reproduces the point cloud.

In step S27, the display control section 94 determines whether or not the user's viewing direction has changed.

In a case where the display control section 94 determines, in step S27, that the user's viewing direction has changed, the process returns to step S21 to repeat similar processes.

Meanwhile, in a case where the display control section 94 determines, in step S27, that the user's viewing direction has not changed, the process proceeds to step S26.

In step S28, the data analysis/decoding section 95 determines whether or not the end of the PC stream has been reached. In a case where the end of the PC stream has yet to be reached, the process returns to step S26 and, in a case where the end of the PC stream has been reached, the process is terminated.

As described above, by sending, by the data generation apparatus 51, the MPD to which projection metadata (projection direction information and display-alone-yes/no information) has been added, the data reproduction apparatus 52 can identify whether or not the AdaptationSet closest to the user's viewing direction can be displayed alone. This makes it possible for the data reproduction apparatus 52 to appropriately acquire the AdaptationSet required to display the user's viewing direction, thus allowing for reproduction of a point cloud enhanced in image quality while, at the same time, reducing increase in throughput required for the point cloud reproduction process.

It should be noted that different colors may be assigned to a point of the point cloud, one color for each projection direction. For example, in a case where the projection direction X+Y+ has overlapping information with the projection direction X+, the color of the overlappingly projected point may be different from one projection direction to another. This makes it possible, when the color changes depending on the viewing direction, to represent glitter and the like, thus allowing for a more realistic point cloud to be configured.

<Image Quality Metadata>

Further, image quality metadata may be defined to enhance the image quality of the divided stream corresponding to the viewing direction.

For example, the image quality of a point cloud depends on the sparsity or the density of points included in the point cloud. If the points included in the point cloud are sparse, the image quality is low. If the points included in the point cloud are dense, the image quality is high. Then, in V-PCC, the sparsity or the density of points in the point cloud reconfigured depends on the resolutions of the texture image and the geometry image.

Here, the term "resolution" refers to the pixel count of the effective patch region, and not the pixel count of the entire texture image or the entire geometry image. That is, the larger this effective pixel count, the higher the image quality of the point cloud reconfigured. For this reason, effective pixel information of the V-PCC streams provided as image quality metadata is an effective index for enhancing the image quality of the point cloud region corresponding to the user's viewing direction.

Accordingly, by adding image quality metadata to each projection direction file, it is possible for the client to select and acquire a file required for reproduction according to the viewing direction on the basis of this information, configure a point cloud that offers high image quality in the viewing direction, and display the point cloud.

A description will be given below of a technique of extending the DASH MPD and adding image quality metadata for each file referred to.

Effective pixel information of a V-PCC stream is signaled by newly defining a point cloud resolution descriptor (SupplementalProperty of schemeIdUri="urn:mpeg:mpegI:pc_resolution:2018"). Here, @value indicates a frame average of a patch total pixel count for each frame in a V-PCC stream, and, for example, a frame average of a total pixel count of a patch region (e.g., white pixels of the occupancy map image illustrated in FIG. 1) that can be calculated from the occupancy map stream is set.

Also, a frame average of the approximate patch size calculated from delta_size_u0 and delta_size_v0 of auxiliary information which is one component of the V-PCC stream may be set.

FIG. 19 illustrates an MPD sample to which image quality metadata has been added.

An example of a stream acquisition method will be described on the basis of this MPD sample in a case where the user's viewing direction corresponds to the projection plane of the projection direction X+. For example, divided streams of AdaptationSet@id=vpcc0 are acquired to construct a point cloud in the viewing direction according to the first signaling method described above, and the other AdaptationSets (omitted in the MPD sample in FIG. 19) are further acquired to construct point clouds as seen from the other directions.

At this time, on the basis of the point cloud resolution descriptor, a representation for constructing a point cloud with high image quality is selected for AdaptationSet@id=vpcc0 corresponding to the viewing direction, and a representation for constructing a point cloud with low image quality is selected for the other AdaptationSets. As described above, it is possible to further enhance the image quality of the point cloud in the viewing direction through effective use of network bandwidth by using image quality metadata.

It should be noted that the point cloud resolution descriptor is applicable to a non-divided V-PCC stream. Also, the point cloud resolution descriptor is effective for selecting a V-PCC stream according to the client's processing capability. For example, a client with low processing capability can select a V-PCC stream with a small number of point clouds configured.

Further, divided V-PCC streams may be selected by using only image quality metadata.

<Using the Extractor>

A description will be given of how an extractor is used with reference to FIGS. 20 and 21.

As described above, the client has leeway by selecting and acquiring divided streams individually. Meanwhile, it is necessary to decode divided streams individually, thus resulting in an increased number of decoder instances required for the client. For this reason, an extractor track which is an ISOBMFF tool is used as illustrated in FIG. 20, thus allowing for decoding using the same number of decoder instances as the number of streams prior to the division.

It should be noted that the extractor track refers to a track using an Extractor function stipulated in ISO/IEC 14496-15 and permits extraction of a bitstream component and reconfiguration of one bitstream by referring to other tracks. Here, the term "bitstream component" refers to one or a plurality of NAL units that can be decoded independently in the case of AVC or HEVC.

For example, as illustrated in the MED sample of FIG. 21, a high quality direction descriptor (SupplementalProperty of schemeIdUri="urn:mpeg:mpegI:pc_hq_direction:2018") is newly defined and signaled as projection direction information enhanced in image quality in a V-PCC stream that includes an extractor track. Here, @value signals projection direction information enhanced in image quality in a V-PCC stream that includes an extractor track.

For example, the projection direction relative to the point cloud's local coordinate system is signaled with @value (0 to 9). That is, in a case where @value=0, the projection direction X+ is signaled, in a case where @value=1, the projection direction Y+ is signaled, in a case where @value=, the projection direction X− is signaled, in a case where @value=3, the projection direction Y− is signaled, in a case where @value=4, the projection direction Z+ is signaled, in a case where @value=5, the projection direction Z− is signaled, in a case where @value=6, the projection direction X+Y+ is signaled, in a case where @value=7, the projection direction X−Y+ is signaled, in a case where @value=8, the projection direction X−Y− is signaled, and in a case where @value=9, the projection direction X+Y− is signaled.

Also, in a case where a plurality of directions is enhanced in image quality, the plurality of directions may be signaled, for example, by comma separation in @value. Also, a point cloud's relative image quality ranking among the projection directions may be signaled.

In this case, the client can reconfigure a V-PCC stream enhanced in image quality in the viewing direction by selecting and acquiring an appropriate extractor track according to the viewing direction first and further acquiring the file referred to by the extractor track. This V-PCC stream can be decoded by the same number of decoders as the number for the V-PCC stream before the division.

In addition to the above, it is possible, as a modification example of the first signaling method, to enhance the subjective image quality as done in the case of adding projection planes, by additionally delivering a stream with a point cloud object projected after rotating the point cloud object 45 degrees about the Z axis with the number of projection planes remaining unchanged at six. At this time, rotation information of the point cloud object at the time of projection may be signaled in the DASH MPD in addition to the metadata described above. It should be noted that this modification example is applicable to the ISOBMFF described later.

<Second Extension Method>

A description will be given of a second extension method of signaling projection direction information, display-alone-yes/no information, and image quality metadata for each track through ISOBMFF extension with reference to FIGS. 22 and 26.

For example, it is possible to add projection metadata (projection direction information and display-alone-yes/no information) and image quality metadata for each track by extending the ISOBMFF.

That is, divided V-PCC streams are each stored in a track, after which these tracks are stored in a multi-track file defined in the ISOBMFF. Then, VPCCGroupBox is newly defined, as illustrated in FIG. 22, as a new track group that groups together divided V-PCC stream tracks included in a piece of point cloud content.

For example, VPCCGroupBox extends TrackGroupType-Box and signals projection metadata (projection direction information and display-alone-yes/no information) and image quality metadata. Here, TrackGroupTypeBox is a tool for grouping together plural tracks having the same characteristic and stipulated in the ISOBMFF.

Also, as illustrated in FIG. 23, projection_direction indicates the projection direction for each patch. That is, in a case where projection_direction=0, the projection direction X+ is signaled, in a case where projection_direction=1, the projection direction Y+ is signaled, in a case where projection_direction=2, the projection direction X− is signaled, in a case where projection_direction=3, the projection direction Y− is signaled, in a case where projection_direction=4, the projection direction Z+ is signaled, in a case where projection_direction=5, the projection direction Z− is signaled, in a case where projection_direction=6, the projection direction X+Y+ is signaled, in a case where projection_direction=7, the projection direction X−Y+ is signaled, in a case where projection_direction=8, the projection direction X−Y− is signaled, and in a case where projection_direction=9, the projection direction X+Y− is signaled.

Also, present_alone indicates whether a point cloud can be constructed and displayed with a track alone. For example, in a case where present_alone=0, this indicates that a point cloud cannot be displayed with a track alone, and in a case where present_alone=1, this indicates that a point cloud can be displayed with a track alone.

Also, point_cloud_resolution indicates the frame average of the patch total pixel count for each frame in a V-PCC stream and indicates the frame average count of the point cloud constructed.

Such ISOBMFF extensions allow for selection of a track according to the viewing direction, decoding of only a divided V-PCC stream required for display, reconstruction of a point cloud, and preferential display thereof rather than decoding all divided V-PCC stream tracks.

Here, patches of the plurality of projection directions may be included in a single divided V-PCC stream. In this case, we assume, for example, that projection_direction is 10 bits long, that these bits are assigned the projection direction X+, and so on up to the projection direction X+Y− in order starting from the most significant bit, and that if 1 is set in each bit field, that projection direction is included. For example, projection direction=1100000000 indicates that the projection direction X+ and the projection direction Y+ are included.

Also, a single divided V-PCC stream may include a patch that can be displayed alone and another patch that cannot be displayed alone. In this case, present_alone=0.

It should be noted that projection metadata and image quality metadata may also be signaled to other than VPCC-GroupBox such as Sample Entry. Also, display-alone-yes/no information may be indicated not as a field of present_alone, but to a track that cannot be displayed alone by means of track reference to a V-PCC stream track required for display thereof (reference_type=vpcc).

Further, a group that can be displayed alone may be defined by extending TrackGroupTypeBox as a new track group. For example, the fact is indicated that the projection direction X+Y+ that can be displayed alone and the projection direction X+ and the projection direction Y+ required for display thereof are grouped together, and that these projection directions can be displayed alone on a group-by-group basis.

<Further Extension of the Second Extension Method>

A description will be given here of further extension of the second extension method.

As described above, the second extension method extends the conventional ISOBMFF in such a manner that projection direction information and the like are available. In addition, it is possible to further extend the ISOBMFF in such a manner that additional projection direction identification information is available to indicate that the four additional projection planes (X+Y+ projection plane, X−Y− projection plane, X−Y+ projection plane, and X+Y− projection plane) are images generated from patches of the four additional projection directions.

For example, 45 degree_projection is signaled as additional projection direction identification information by defining VPCCGroupBox as illustrated in FIG. 24. Then, in a case where 45 degree_projection=0 as illustrated in FIG. 25, this indicates that the stream has been generated from patches of the six projection directions, and in a case where 45 degree_projection=1, this indicates that the stream has been generated from patches of the four additional projection directions. Also, projection_direction indicates projection direction information (0: X+, 1: Y+, 2: X−, 3: Y−, 4: Z+, 5: Z−).

For example, in a case where it is indicated as illustrated in FIG. 24 that 45 degree_projection and projection_direction are signaled and that the image has been generated from patches of the four additional projection directions by 45 degree_projection=1, this indicates that the projection direction is the direction rotated counterclockwise 45 degrees about the Z axis in the direction indicated by projection_direction. Also, projection_direction=0 signaled together with 45 degree_projection=1 indicates that the projection direction is X+Y+.

It should be noted that only 45 degree_projection may be signaled without signaling projection_direction. In this case, if 45 degree_projection=0, this indicates that the stream has been generated from patches of all the six projection directions, and if 45 degree_projection=1, this indicates that the stream has been generated from patches of all the four additional projection directions.

Here, in a case where a projection direction file is generated for each block as done for further extension of the first extension method described above, 45 degree_projection signaled for each block can be used together with block position information for identifying three-dimensional space information of each block.

For example, block position information is signaled by defining VPCCGroupBox as illustrated in FIG. 26. For example, block position information can be indicated by respective fields, that is, block_offset_x, block_offset_y, block_offset_z, block_size_x, block_size_y, and block_size_z. These fields are all signaled by a relative value obtained by assuming that each of the sides along the X axis, the Y axis, and the Z axis of the object box is 1 as illustrated above in FIG. 14. Also, blocks included in the same object box can be signaled by using the function of TrackGroupTypeBox from which VPCCGroupBox is extended.

It should be noted that only 45 degree_projection and block position information may be signaled without signaling projection_direction. In this case, if 45 degree_projection=0, this indicates that the projection direction file of each block is a stream generated from patches of six projection directions, and if 45 degree_projection=1, this indicates that the projection direction file of each block is a stream generated from patches of four additional projection directions.

As described above, the second extension method allows for extension of the ISOBMFF in such a manner that additional projection direction identification information is signaled in addition to projection direction information.

<Third Extension Method>

A description will be given of a third extension method of signaling projection direction information, display-alone-yes/no information, and image quality metadata for each patch through Elementary Stream extension with reference to FIGS. 27 to 30.

For example, it is possible to add projection metadata and image quality metadata for each patch by extending high level syntax of Elementary Stream. That is, projection metadata and image quality metadata are signaled by extending the high level syntax of the V-PCC stream.

FIG. 27 illustrates an example of extending auxiliary information which is one component of the V-PCC stream.

For example, as illustrated in FIG. 28, projection_direction indicates the projection direction for each patch. That is, in a case where projection_direction=0, the projection direction X+ is signaled, in a case where projection direction=1, the projection direction Y+ is signaled, in a case where projection_direction=2, the projection direction X− is signaled, in a case where projection direction=3, the projection direction Y− is signaled, in a case where projection_direction=4, the projection direction Z+ is signaled, in a case where projection_direction=5, the projection direction Z− is signaled, in a case where projection_direction=6, the projection direction X+Y+ is signaled, in a case where projection direction=7, the projection direction X−Y+ is signaled, in a case where projection_direction=8, the projection direction X−Y− is signaled, and in a case where projection_direction=9, the projection direction X+Y− is signaled.

Also, present_alone indicates whether a point cloud can be constructed and displayed with a patch alone. For example, in a case where present_alone=0, this indicates that a point cloud cannot be displayed with a patch alone, and in a case where present_alone=1, this indicates that a point cloud can be displayed with a patch alone.

Also, point_cloud_resolution indicates the patch pixel count.

It should be noted that, in a case where all the patches included in a single V-PCC stream have the same projection_direction value or the same present_alone value, each of the patches may be signaled with a single field (default_projection_direction, default_present_alone). Also, a field indicating the sum of the point_cloud_resolution values of the respective patches may be signaled. Then, each field is signaled immediately after an occupancy_aux_stream_size field.

Further, in a case where a patch cannot be displayed alone, the identifier of an additional patch required to display the patch may be signaled.

For example, in a case where a divided V-PCC stream includes patches of a plurality of projection directions, where the patches have been grouped together into a region for each projection direction, and where each region has been coded by a coding method that permits decoding of each region independently, it is possible to select and decode, from among divided V-PCC streams, only a necessary region according to the viewing direction, reconstruct a point cloud, and preferentially display the point cloud by referring to projection metadata and image quality metadata at the Elementary Stream level. For example, HEVC is used as a coding codec, and in that case, it is possible to decode a region coded with an HEVC tile independently.

At this time, a duplicated_patch field may be added by extending VPCCGroupBox of the ISOBMFF track storing the V-PCC stream. 1 is signaled in this field if the V-PCC stream stored in the track includes a patch including overlapping information, and 0 is signaled otherwise. Also, in a case where duplicated_patch=1, it is possible to prepare for a post-process in the presence of overlapping information ahead of the decoding process.

<Further Extension of the Third Extension Method>

A description will be given here of further extension of the third extension method.

As descried above, the third extension method extends the conventional Elementary Stream in such a manner that projection direction information and the like are available. In addition, it is possible to further extend the Elementary Stream in such a manner that additional projection direction identification information is available to indicate that the four additional projection planes (X+Y+ projection plane, X−Y− projection plane, X−Y+ projection plane, and X+Y− projection plane) are images generated from patches of the four additional projection directions.

For example, as illustrated in FIG. 29, 45 degree_projection is signaled as additional projection direction identification information. It should be noted that auxiliary information illustrated in FIG. 29 has been extracted from part of auxiliary information illustrated in FIG. 27.

For example, in a case where 45 degree_projection=0 as illustrated in FIG. 30, this indicates that patches are of the six projection directions, and in a case where 45 degree_projection=1, this indicates that patches are of the four additional projection directions. Also, projection_direction indicates projection direction information (0: X+, 1: Y+, 2: X−, 3: Y−, 4: Z+, 5: Z−).

In a case where it is indicated, as illustrated in FIG. 29, that 45 degree_projection and projection_direction are signaled and that the image has been generated from patches of the four additional projection directions by 45 degree_projection=1, this indicates that the projection direction is the direction rotated counterclockwise 45 degrees about the Z axis is the direction indicated by projection direction. Also, projection_direction=0 signaled together with 45 degree_projection=1 indicates that the projection direction is X+Y+.

As described above, the third extension method can extend the Elementary Stream such that additional projection direction identification information is signaled in addition to projection direction information.

As described above, according to the present technology, DASH MPD metadata is defined that signals projection direction information and display-alone-yes/no information of patches within divided streams at the time of delivery through DASH following division of a V-PCC stream. Further, DASH MPL metadata is defined that signals additional projection direction identification information. This makes it possible to deliver V-PCC streams enhanced in image quality by adding projection planes while, at the same time, reducing increase in processing overhead on the client side through effective use of network bandwidth.

For example, the conventional technique is premised on the fact that an entire stream of a texture image, a geometry image, and an occupancy map image is acquired, inevitably resulting in increased bit rates by as much as the increase in number of projection planes as compared to a stream with six projection planes at the time of delivery of a V-PCC stream. In order to solve this problem, a possible solution to this problem would be to divide a V-PCC stream (texture stream, geometry stream, and occupancy map stream) for each projection plane and select and deliver the divided V-PCC stream of a necessary projection plane according to the user's viewing direction in an environment of limited network bandwidth. In this case, however, the client side has been unable to identify whether or not patches of additional projection planes have all projection direction information, thus making it impossible to determine whether the image can be displayed alone properly.

As opposed to such a conventional technique, it is possible, according to the present technology, to select and deliver only a necessary divided V-PCC stream according to the client's viewing direction in an environment of limited network bandwidth by signaling projection direction information and display-alone-yes/no information. That is, it is not necessary to acquire all V-PCC streams on the premise that all projection direction information is not always available, thus avoiding the acquisition of unnecessary divided streams.

Further, it is possible to enhance the image quality of the V-PCC stream in the viewing direction by extending the DASH MPD and signaling image quality metadata.

Also, it is possible, according to the present technology, to select a track according to the viewing direction, decode only a divided V-PCC stream required for display, reconstruct a point cloud, and preferentially display the point cloud through ISOBMFF extensions for dividing and storing a V-PCC stream rather than decoding all divided V-PCC stream tracks.

Also, in a case where patches of a plurality of projection directions are included in the divided V-PCC stream, it is possible, according to the present technology, to select and decode only a required region according to the viewing direction, reconstruct a point cloud, and preferentially display the point cloud by extending the high level syntax of the V-PCC stream and signaling projection metadata and image quality metadata.

<Configuration Example of the Computer>

Next, the series of processes (information processing method) described above can be performed by hardware or software. In a case where the series of processes are performed by software, a program included in the software is installed in a general-purpose computer or the like.

FIG. 31 is a block diagram illustrating a configuration example of an embodiment of a computer in which the program for performing the above series of processes is installed.

The program can be recorded in advance in a hard disk 105 or a RCM 103 as a recording medium built into the computer.

Alternatively, the program can be stored (recorded) in a removable recording medium 111 that is driven by a drive 109. The removable recording medium 111 described above can be provided as what is generally called package software. Here, a flexible disk, a CD-ROM (Compact Disc Read Only Memory), an MO (Magneto Optical) disk, a DVD (Digital Versatile Disc), a magnetic disk, and a semiconductor memory can be cited as examples of the removable recording medium 111.

It should be noted that, in addition to installation in the computer from the removable recording medium 111 as described above, the program can be downloaded to the computer via a communication network or a broadcasting network and installed in the build-in hard disk 105. That is, the program can be transferred wirelessly to the computer from a download site via an artificial satellite for digital satellite broadcasting or in a wired manner to the computer via a network such as a LAN (Local Area Network) or the Internet.

The computer incorporates a CPU (Central Processing Unit) 102 to which an input/output interface 110 are connected via a bus 101.

When an instruction is input, for example, as a result of operation of an input section 107 by the user, the CPU 102 executes the program stored in the ROM (Read Only Memory) 103 via the input/output interface 110. Alternatively, the CPU 102 loads the program stored in the hard disk 105 into a RAM (Random Access Memory) 104 for execution.

This allows processes as per the above flowchart or processes performed by the components in the above block diagram to be performed. Then, the CPU 102 causes the processing result thereof to be output from an output section 106 via the input/output interface 110 or sent from a communication section 108 and further, for example, recorded in the hard disk 105.

It should be noted that the input section 107 includes a keyboard, a mouse, a microphone, and the like. Also, the output section 106 includes an LCD (Liquid Crystal Display), a speaker, and the like.

Here, in the present description, the processes performed by the computer as per the program need not necessarily be performed chronologically according to the sequence described in the flowchart. That is, the processes performed by the computer as per the program include processes performed in parallel or individually (e.g., parallel processes or object-based processes).

Also, the program may be processed by a single computer (processor) or by a plurality of computers in a distributed manner. Further, the program may be transferred to a remote computer for execution.

The term "system" in the present description refers to a set of a plurality of components (e.g., apparatuses, modules (parts)), and it does not matter whether or not all the components are accommodated in the same housing. Accordingly, a plurality of apparatuses accommodated in different housings and connected via a network and a single apparatus in which a plurality of modules accommodated in a single housing are both systems.

Also, for example, a component described as a single apparatus (or processing section) may be divided and configured as a plurality of apparatuses (or processing sections). Conversely, components described above as a plurality of apparatuses (or processing sections) may be combined and configured as a single apparatus (or processing section). Also, a component other than the above may be naturally added to the components of each of the apparatuses (or processing sections). Further, as long as the components and actions of the system as a whole substantially remain the same, part of the component of an apparatus (or processing section) may be included in the component of another apparatus (or processing section).

Also, for example, the present technology can have a cloud computing configuration in which a function is processed in a shared and cooperative manner by a plurality of apparatuses via a network.

Also, for example, the above program can be executed by a desired apparatus. In that case, it is sufficient if the apparatus has necessary functions (e.g., functional blocks) to acquire necessary information.

Also, for example, each of the steps described in the above flowchart can be performed not only by a single apparatus but also by a plurality of apparatuses in a shared manner. Further, in a case where a single step includes a plurality of processes, the plurality of processes included in that single step can be performed only by a single apparatus but also by a plurality of apparatuses in a shared manner. In other words, a plurality of processes included in a single step can be performed as processes of a plurality of steps. Conversely, processes described as a plurality of steps can be performed together as a single step.

It should be noted that the processes in the steps describing the program executed by the computer may be performed chronologically according to the sequence explained in the present description or performed in parallel or individually at a necessary timing as when, for example, the program is called. That is, unless inconsistency arises, the processes of the respective steps may be performed in a different order from the order described above. Further, the processes of the steps describing this program may be performed in parallel with processes of another program or combined and performed together with processes of another program.

Each of the plural present technologies described in the present description can be performed independently and alone unless inconsistency arises. Needless to say, the plural desired present technologies can be performed in combination. For example, some or all of the present technologies described in any one of the embodiments can be combined and performed together with some or all of the present technologies described in other embodiments. Also, some or all of the desired present technologies described above can be performed in combination with other technologies not described above.

<Examples of Combinations of Components>

It should be noted that the present technologies can also have the following configurations:

(1)

An information processing apparatus including:

a preprocessing section adapted to generate image data of a plurality of projection directions by projecting 3D data in a plurality of the projection directions and converting the 3D data into two-dimensional data and generate projection direction information indicating the projection directions of the image data as projection metadata.

(2)

The information processing apparatus according to (1), in which the projection metadata includes additional projection direction identification information that indicates that the image data has been generated by projection in additional projection directions.

(3)

The information processing apparatus according to (2), in which the image data has a texture image, a geometry image, and an occupancy map image for each of the projection directions.

(4)

The information processing apparatus according to (3), in which the preprocessing section further generates, as the projection metadata, display-alone-yes/no information indicating whether or not the image data in the projection directions indicated by the projection direction information or the additional projection direction identification information is able to be displayed alone.

(5)

The information processing apparatus according to any one of (1) to (4), in which the preprocessing section further generates, as image quality metadata, an effective pixel count of the image data.

(6)

The information processing apparatus according to any one of (1) to (5), further including:

an MPD file generation section adapted to generate an MPD (Media Presentation Description) that signals the generated projection metadata for each of files, the files each being a data unit for reference when the 3D data is displayed.

(7)

The information processing apparatus according to (6), in which in a case where the 3D data is not able to be displayed alone with one of the files, the MPD file generation section signals association with another file among the files, the another file being required to display the 3D data.

(8)

The information processing apparatus according to (6), in which in a case where the 3D data is not able to be displayed alone with one of the files, the MPD file generation section groups together, for signaling, the file and another file among the files, the another file being required to display the 3D data.

(9)

The information processing apparatus according to any one of (1) to (5), further including:

a file generation section adapted to generate an ISOBMFF (ISO Base Media File Format) file that signals the projection metadata for each of track, the tracks each being the data unit of a plurality of the projection directions.

(10)

The information processing apparatus according to (9), in which in a case where the 3D data is not able to be displayed alone with one of the tracks, the file generation section groups together, for signaling, the track and another track among the tracks, the another track being required to display the 3D data.

(11)

The information processing apparatus according to any one of (1) to (5), further including:

a coding section adapted to code an Elementary Stream that signals the projection metadata for each of patches, the patches each being the data unit of a plurality of the projection directions.

(12)

The information processing apparatus according to (11), in which in a case where the 3D data is not able to be displayed alone with one of the patches, the coding section groups together, for signaling, the patch and an identifier of an additional patch required to display the 3D data.

(13)

The information processing apparatus according to (4), in which in a case where the image data of the projection directions has been generated on the basis of a block which is part of an object box in a shape of a rectangular parallelepiped including the 3D data, the preprocessing section further generates, as the projection metadata, block position information that identifies a position of each of the blocks in a three-dimensional space relative to the object box.

(14)

An information processing method including:

by an information processing apparatus, generating image data of a plurality of projection directions by projecting 3D data in a plurality of the projection directions and converting the data into two-dimensional data; and generating projection direction information indicating the projection directions of the image data as projection metadata.

It should be noted that the present embodiments are not limited to the embodiments described above and can be modified in various ways without departing from the gist of the present disclosure. Also, the advantageous effect described in the present description is merely illustrative and not restrictive, and there may be other advantageous effects.

REFERENCE SIGNS LIST

51: Data generation apparatus
52: Data reproduction apparatus
61: Control section
62: File generation section
71: Data input section
72: Data coding/generation section
73: MPD file generation section
74: Recording section
75: Uploading section
76: Preprocessing section
77: Coding section
78: File generation section
81: Control section
82: Reproduction process section
91: File acquisition section
92: File processing section
94: Display control section
95: Data analysis/decoding section
96: Display section
97: File processing section
98: Decoding section
99: Display information generation section

The invention claimed is:

1. An information processing apparatus comprising:
a preprocessing section configured to
    generate a two-dimensional (2D) image corresponding to point cloud data by projecting three-dimensional (3D) data on six surfaces of point cloud content represented by the point cloud data, and
    generate projection direction information indicating projection directions of the 3D data as projection metadata; and
a file generation section configured to generate an ISOBMFF (ISO Base Media File Format) file including a track group that signals the projection metadata by grouping each track of a plurality of tracks corresponding to respective surfaces of the six surfaces of the point cloud content, each track of the plurality of tracks being a data unit of the six surfaces,
wherein the preprocessing section and the file generation section are each implemented via at least one processor.

2. The information processing apparatus according to claim 1, further comprising:
a coding section configured to code an Elementary Stream that signals the projection metadata for each patch of a plurality of patches corresponding to respective surfaces of the six surfaces of the point cloud content, each patch of the plurality of patches being a data unit of the six surfaces, wherein the coding section is implemented via at least one processor.

3. An information processing method comprising:

by an information processing apparatus, generating a two-dimensional (2D) image corresponding to point cloud data by projecting three-dimensional (3D) data on six surfaces of point cloud content represented by the point cloud data;

generating projection direction information indicating projection directions of the 3D data as projection metadata; and generating an ISOBMFF (ISO Base Media File Format) file including a track group that signals the projection metadata by grouping each track of a plurality of tracks corresponding to respective surfaces of the six surfaces of the point cloud content, each track of the plurality of tracks being a data unit of the six surfaces.

4. A non-transitory computer-readable medium having embodied thereon a program, which when executed by a computer causes the computer to execute an information processing method, the method comprising:

generating a two-dimensional (2D) image corresponding to point cloud data by projecting three-dimensional (3D) data on six surfaces of point cloud content represented by the point cloud data;

generating projection direction information indicating projection directions of the 3D data as projection metadata; and generating an ISOBMFF (ISO Base Media File Format) file including a track group that signals the projection metadata by grouping each track of a plurality of tracks corresponding to respective surfaces of the six surfaces of the point cloud content, each track of the plurality of tracks being a data unit of the six surfaces.

* * * * *